United States Patent
Rune et al.

(10) Patent No.: US 12,452,698 B2
(45) Date of Patent: Oct. 21, 2025

(54) COLLECTION AND REPORTING OF CHANNEL OCCUPANCY STATISTICS FOR NETWORK TUNING

(71) Applicant: Telefonaktiebolaget LM Ericsson (publ), Stockholm (SE)

(72) Inventors: Johan Rune, Lidingö (SE); Peter Alriksson, Hörby (SE); Marco Belleschi, Solna (SE); Stephen Grant, Pleasanton, CA (US); Robert Karlsson, Sundbyberg (SE); Christopher Richards, Ottawa (CA); Iana Siomina, Täby (SE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 333 days.

(21) Appl. No.: 17/599,115

(22) PCT Filed: Mar. 27, 2020

(86) PCT No.: PCT/IB2020/052956
§ 371 (c)(1),
(2) Date: Sep. 28, 2021

(87) PCT Pub. No.: WO2020/194268
PCT Pub. Date: Oct. 1, 2020

(65) Prior Publication Data
US 2022/0174512 A1    Jun. 2, 2022

Related U.S. Application Data

(60) Provisional application No. 62/825,452, filed on Mar. 28, 2019.

(51) Int. Cl.
*H04W 24/02* (2009.01)
*H04B 17/318* (2015.01)
(Continued)

(52) U.S. Cl.
CPC .......... *H04W 24/02* (2013.01); *H04B 17/318* (2015.01); *H04W 24/10* (2013.01);
(Continued)

(58) Field of Classification Search
CPC ..... H04W 24/10; H04W 16/14; H04W 24/02; H04W 24/08; H04W 36/0085; H04W 74/0808; H04W 76/27; H04B 17/318
See application file for complete search history.

(56) References Cited

U.S. PATENT DOCUMENTS

2016/0338118 A1    11/2016  Vajapeyam et al.
2016/0345345 A1*   11/2016  Malik ................... H04W 24/10
(Continued)

FOREIGN PATENT DOCUMENTS

| CN | 105792276 A | 7/2016 |
|---|---|---|
| CN | 105991244 A | 10/2016 |
| WO | 2018065050 A1 | 4/2018 |

OTHER PUBLICATIONS

Author Unknown, "Technical Specification Group Core Network and Terminals; Non-Access-Stratum (NAS) protocol for 5G System (5GS); Stage 3 (Release 15)," Technical Specification 24.501, Version 15.2.1, Jan. 2019, 3GPP Organizational Partners, 455 pages.

(Continued)

*Primary Examiner* — Mansour Oveissi
(74) *Attorney, Agent, or Firm* — Withrow & Terranova, PLLC

(57) ABSTRACT

Systems and methods for collection and reporting of Channel Occupancy (CO) statistics for network tuning are provided. In some embodiments, a method performed by a wireless device for tuning one or more parameters of a network comprises obtaining a configuration for CO measurement and reporting. The method also includes obtaining (Continued)

a plurality of CO measurements based on the obtained configuration for CO measurement and reporting. One or more of the plurality of CO measurements are obtained when a Radio Resource Control (RRC) state of the wireless device is RRC_INACTIVE or RRC_IDLE. One or more of the plurality of CO measurements are obtained when the RRC state is RRC_CONNECTED. The method also includes reporting a result of one or more of the plurality of CO measurements to a network node. This might allow improved tuning of networks such as tuning of mechanisms that are used to compensate for potential CCA/LBT failures.

26 Claims, 11 Drawing Sheets

(51) Int. Cl.
    *H04W 24/10*     (2009.01)
    *H04W 16/14*     (2009.01)
    *H04W 74/0808*     (2024.01)
    *H04W 76/27*     (2018.01)

(52) U.S. Cl.
    CPC ........ *H04W 16/14* (2013.01); *H04W 74/0808* (2013.01); *H04W 76/27* (2018.02)

(56) References Cited

U.S. PATENT DOCUMENTS

| | | | |
|---|---|---|---|
| 2018/0175975 A1 | 6/2018 | Um et al. | |
| 2019/0141554 A1* | 5/2019 | Siomina | H04W 64/003 |
| 2019/0306738 A1* | 10/2019 | Berggren | H04W 48/16 |
| 2020/0107373 A1* | 4/2020 | Roy | H04W 74/0833 |
| 2022/0026517 A1* | 1/2022 | Hasegawa | G01S 5/0236 |

OTHER PUBLICATIONS

Author Unknown, "Technical Specification Group Radio Access Network; Evolved Universal Terrestrial Radio Access (E-UTRA); Physical layer procedures (Release 15)," Technical Specification 36.213, Version 15.4.0, Dec. 2018, 3GPP Organizational Partners, 544 pages.

Author Unknown, "Technical Specification Group Radio Access Network; Evolved Universal Terrestrial Radio Access (E-UTRA) and Evolved Universal Terrestrial Radio Access Network (E-UTRAN); Overall description; Stage 2 (Release 15)," Technical Specification 36.300, Version 15.4.0, Dec. 2018, 3GPP Organizational Partners, 363 pages.

Author Unknown, "Technical Specification Group Radio Access Network; NR; User Equipment (UE) procedures in Idle mode and RRC Inactive state (Release 15)," Technical Specification 38.304, Version 15.2.0, Dec. 2018, 3GPP Organizational Partners, 28 pages.

Author Unknown, "Technical Specification Group Radio Access Network; NR; Radio Resource Control (RRC) protocol specification (Release 15)," Technical Specification 38.331, Version 15.4.0, Dec. 2018, 3GPP Organizational Partners, 474 pages.

Author Unknown, "5GHz RLAN; Harmonised Standard covering the essential requirements of article 3.2 of Directive 2014/53/EU," EN 301.893, Version 2.1.1., May 2017, ETSI, 122 pages.

Mediatek Inc., "R2-1900245: Idle/Inactive Mode Measurements in NR-U," 3GPP TSG-RAN2#105 meeting, Feb. 25-Mar. 1, 2019, Athens, Greece, 3 pages.

Samsung, "R2-1813640: Group BWP switching in unlicensed band," 3GPP TSG-RAN WG2, Meeting #103bis, Oct. 8-12, 2018, Chengdu, China, 3 pages.

International Search Report and Written Opinion for International Patent Application No. PCT/IB2020/052956, mailed Jul. 15, 2020, 17 pages.

Written Opinion for International Patent Application No. PCT/IB2020/052956, mailed Feb. 15, 2021, 6 pages.

International Preliminary Report on Patentability for International Patent Application No. PCT/IB2020/052956, mailed Apr. 6, 2021, 9 pages.

First Office Action for Chinese Patent Application No. 202080024761.4, mailed Oct. 31, 2023, 14 pages.

Second Office Action for Chinese Patent Application No. 202080024761.4, mailed Mar. 21, 2024, 16 pages.

\* cited by examiner

Transmission opportunities both with and without COT sharing where CCA is performed by the initiating node (gNB). For the case of COT sharing the gap between DL and UL transmission is less than 16 μs

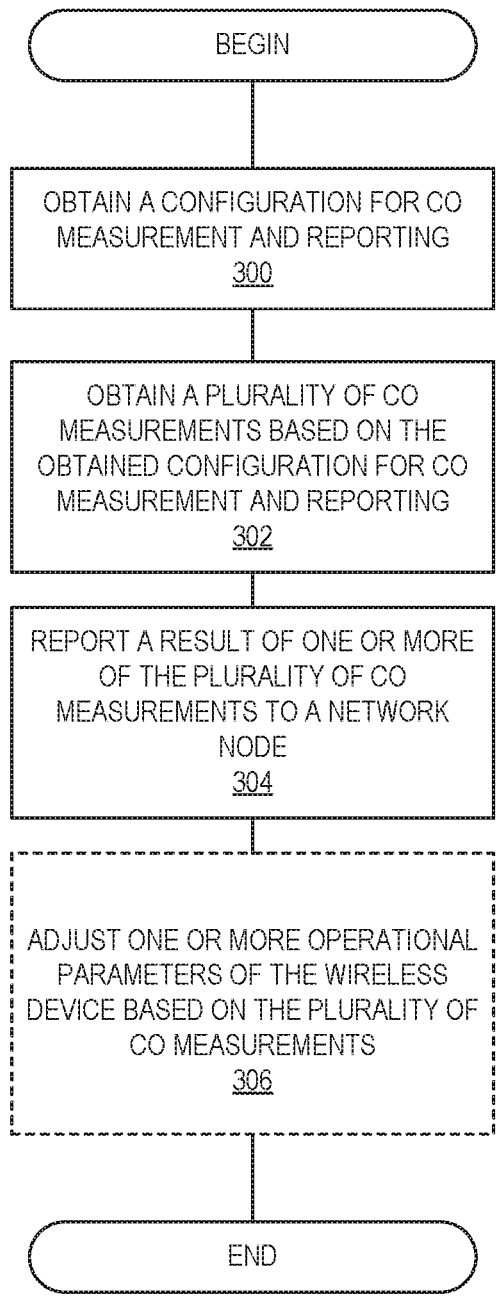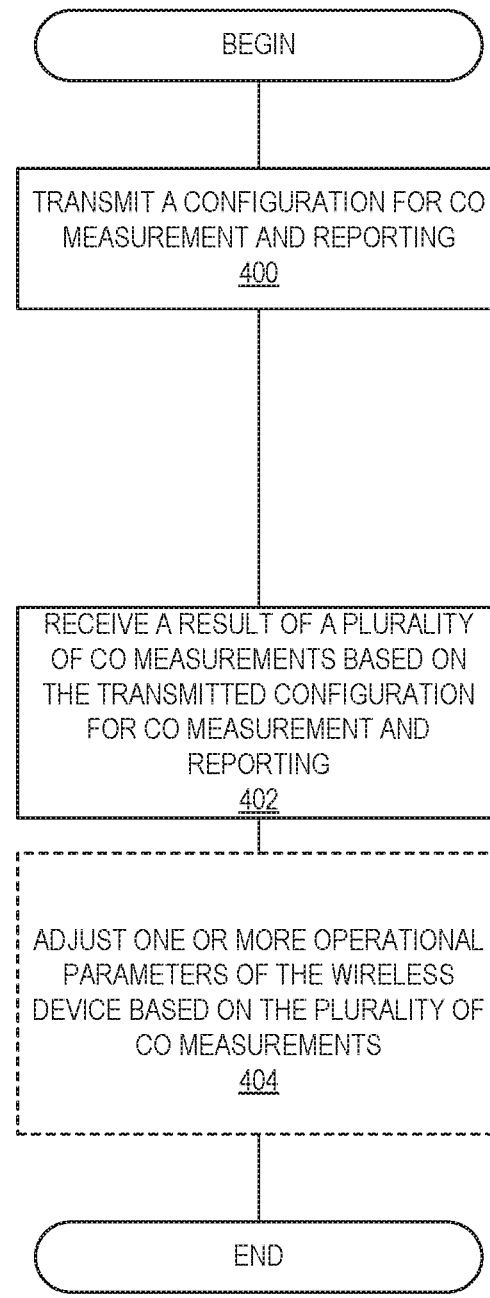
FIG. 3
FIG. 4

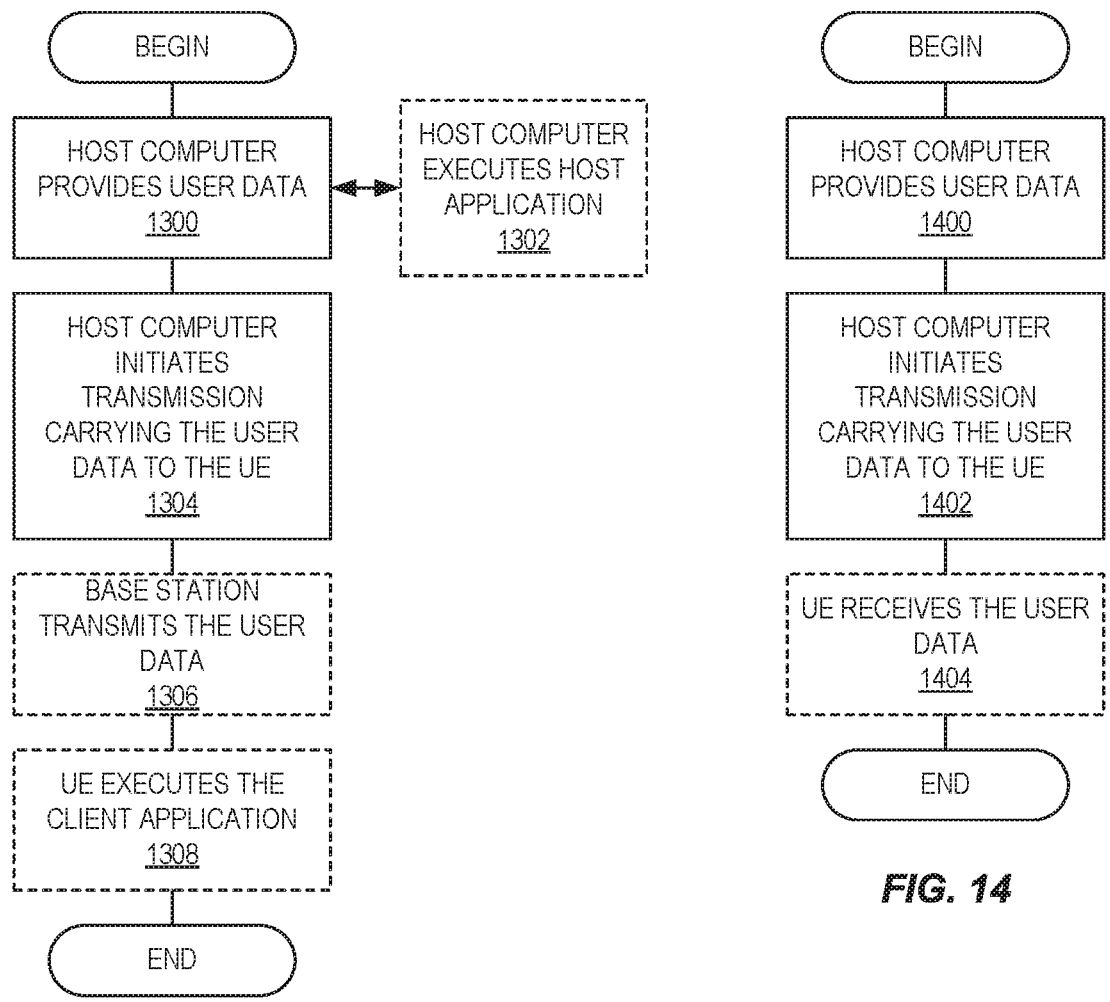

COLLECTION AND REPORTING OF CHANNEL OCCUPANCY STATISTICS FOR NETWORK TUNING

RELATED APPLICATIONS

This application is a 35 U.S.C. § 371 national phase filing of International Application No. PCT/IB2020/052956, filed Mar. 27, 2020, which claims the benefit of provisional patent application Ser. No. 62/825,452, filed Mar. 28, 2019, the disclosures of which are hereby incorporated herein by reference in their entireties.

TECHNICAL FIELD

The current disclosure relates to network tuning and ways to collect information to use in network tuning.

BACKGROUND

The Third Generation Partnership Project (3GPP) is a standardization body which has specified standards for several international cellular systems building on Global Systems for Mobile Communications (GSMs), General Packet Radio Services (GPRSs) and Enhanced Data Rates for Global System for Mobile Communications Evolution (EDGE) (which were standardized by the European Telecommunications Standards Institute (ETSI)), among which in particular may be mentioned Wideband Code Division Multiple Access, Long Term Evolution (LTE) and a first basic version of the Fifth Generation (5G) system New Radio (NR) and its counterpart on the core network side, Next Generation Core (NGC). The standards are maintained to varying degrees (e.g., error corrections) and evolved, but currently the main focus of 3GPP is the completion of basic functionality and further evolution of NR and NGC. 3GPP has traditionally standardized cellular systems for licensed spectrum, where a single operator has exclusive access to one or multiple portion(s) of the spectrum at any one place or area (or multiple operators share spectrum availability through a common shared network which is operated in spectrum range(s) covered by an acquired license), such as a country).

However, for LTE and NR, 3GPP has extended its scope to specify operation of the systems also in unlicensed spectrum. For LTE, 3GPP has only specified such operation in terms of so-called License Assisted Access (LAA), where an LTE cell in unlicensed spectrum operates in carrier aggregation or dual connectivity mode with one or more LTE cell(s) in licensed spectrum (also called "tight interworking"), acting as primary carrier and/or Master Cell Group. A separate forum called Multefire has then gone on to specify also stand-alone operation of LTE cells in unlicensed spectrum. For NR, operation in unlicensed spectrum is not part of the first release of the standard (3GPP release 15), but it is planned for the second release (3GPP release 16) and the specification work starts in the first quarter of 2019. Both tight interworking and stand-alone operation will be specified by 3GPP. NR operation in unlicensed spectrum is denoted NR-U.

Operation in unlicensed spectrum is inherently different from operation in licensed spectrum in that the spectrum may be shared by multiple networks, including networks operating according to different standards, e.g., LTE-LAA or Wi-Fi. Hence, although a guiding principle in the NR specification work is to reuse as much as possible from regular NR (i.e., NR operating in licensed spectrum), NR-U will have to conform to the regulatory requirements of operation in unlicensed spectrum, including the so-called Listen-Before-Talk (LBT) principle, where a device/node has to perform a Clear Channel Assessment (CCA) with a positive outcome in the radio channel/spectrum it intends to transmit in before it is allowed to initiate the transmission.

A CCA consists of monitoring the channel for a certain specified time and measuring the received energy (and/or, in Wi-Fi, checking for preamble transmission indicating the beginning of another device's transmission). The received energy must be below a certain threshold (and/or no Wi-Fi preamble must be detected/received) in order for the channel to be assessed as clear, allowing the monitoring device/node to initiate its own transmission. After sensing the medium to be idle, the device/node is typically allowed to transmit for a certain amount of time, sometimes referred to as the Channel Occupancy Time (COT) or Maximum Channel Occupancy Time (MCOT). The maximum allowed length of the COT depends on regulation and type of CCA (e.g., for how long time the medium was sensed) that has been performed, but typically ranges from 1 ms to 10 ms. Gaps up to 16 µs are allowed in the transmission without performing an additional CCA.

The CCA-free 16 µs gap was introduced to accommodate the turn-around time from reception of a transmission to acknowledgement of the transmission in Wi-Fi. It is anticipated that for NR-U, a similar gap to accommodate the radio turnaround time will be allowed. For example, this will enable the transmission of a Physical Uplink Control Channel (PUCCH) carrying Uplink Control Information (UCI) feedback as well as a Physical Uplink Shared Channel (PUSCH) carrying data and possible UCI within the CCA before PUSCH/PUCCH transmission as long as the gap between a Downlink (DL) and Uplink (UL) transmission is less than or equal to 16 µs. Another option in case the gap is larger than 16 µs is for the UE to perform a short 25 µs CCA. Operation in this manner is typically called "COT sharing."

FIG. 1 illustrates a transmission opportunity both with and without COT sharing after a successful CCA at the gNB.

The CCA/LBT mechanism, as well as other properties that are specific to operation in unlicensed spectrum, inevitably forces NR-U to deviate from regular NR and adapt the functionality on a number of points. For instance, the network can configure or allocate time windows instead of single occasions or a surplus of transmission occasions to compensate for potential CCA failures, i.e., to increase the chances of transmission success despite potential CCA failures. Examples when this may be used include System Information (SI) transmissions, paging transmissions, PUCCH transmissions, etc. Other ways of adapting to the operation condition in unlicensed spectrum include, e.g., behavioral adaptations to accommodate the risk that a reference signal or data transmission expected to be received is absent (and that this may be due to CCA failure rather than a poor channel quality or lost radio link).

Another consequence of the largely uncoordinated operation in unlicensed spectrum is that networks operated by different operators may share the same spectrum in the same location. A property of the unlicensed spectrum that mitigates any problem caused by the spectrum sharing is that the unlicensed spectrum can be divided into parts/subranges, sometimes referred to as channels, typically consisting of 20 MHz each. A network can selectively choose to operate in only one or more of such spectrum parts/channels. (In NR-U, such spectrum parts/channels are mostly referred to as Bandwidth Parts (BWPs), reusing the term and concept from regular NR, where a BWP is a part of the full carrier bandwidth, which can be allocated to User Equipments (UEs) when a Radio Resource Control (RRC) state of the wireless device is RRC_CONNECTED and/or RRC_INACTIVE and RRC_IDLE state.) To this end, a network may mitigate the problem of spectrum sharing by favoring operation in less loaded channels, i.e., channels for which the channel occupancy is low.

CCA/LBT Categories

As described above, Listen-Before-Talk (LBT) is designed for unlicensed spectrum co-existence with other Radio Access Technologies (RATs) and other users of the system and the medium. In this mechanism, a radio device applies a Clear Channel Assessment (CCA) check before any transmission. The transmitter involves energy detection (ED) over a time period compared to a certain threshold (ED threshold) in order to determine if a channel is idle. Another CCA mechanism is to detect a known preamble. In case the channel is determined to be occupied, the transmitter performs a random back-off within a contention window before a next CCA attempt. In order to protect the ACK transmissions, the transmitter must defer a period after each busy CCA slot prior to resuming back-off. As soon as the transmitter has grasped the channel, the transmitter is only allowed to perform transmission up to a maximum time duration called the MCOT. For Quality of Service (QoS) differentiation, a channel access priority scheme based on the service type has been defined. For example, in LTE-LAA, four CCA/LBT Channel Access Priority Classes (CAPCs) are defined for differentiation of contention window sizes (CWS) and MCOT between services. In particular, in LTE-LAA, the following mapping between CAPCs and QoS Channel Indicators (QCIs) is defined in TS 36.300:

| Channel Access Priority | QCI |
|---|---|
| 1 | 1, 3, 5, 65, 66, 69, 70 |
| 2 | 2, 7 |
| 3 | 4, 6, 8, 9 |
| 4 | — |

Therefore, when scheduling UL/DL traffic, the evolved or enhanced NodeB (eNB) should take into account the QCI of the traffic to be transmitted. For uplink, the CAPC that the UE needs to use for a given UL transmission is either signaled in the UL grant on the PDCCH for dynamic scheduling or indicated as part of a logical channel configuration for autonomous LTE-LAA UL transmissions. In the latter case, the UE shall apply the CAPC indicated in the logical channel configuration when autonomously transmitting data from that logical channel. In case there are multiple Medium Access Control (MAC) Service Data Units (SDUs) multiplexed in the same MAC Protocol Data Unit (PDU) and associated with different logical channels, the UE shall apply the lowest CAPC (highest p in the table above) of all the logical channels included in the MAC PDU.

The channel access schemes for NR-based access for unlicensed spectrum can be classified into the following categories:

Category 1: Immediate transmission after a short switching gap. This is used for a transmitter to immediately transmit after a UL/DL switching gap inside a COT. The reason for the switching gap from reception to transmission is to accommodate the transceiver turn-around time and is no longer than 16 μs.

Category 2: CCA/LBT without random back-off. The duration of time that the channel is sensed to be idle before the transmitting entity transmits is deterministic.

Category 3: CCA/LBT with random back-off with a contention window of fixed size. The CCA/LBT procedure has the following procedure as one of its components. The transmitting entity draws a random number N within a contention window. The size of the contention window is specified by the minimum and maximum value of N. The size of the contention window is fixed. The random number N is used in the CCA/LBT procedure to determine the duration of time that the channel is sensed to be idle before the transmitting entity transmits on the channel.

Category 4: CCA/LBT with random back-off with a contention window of variable size. The LBT procedure has the following as one of its components. The transmitting entity draws a random number N within a contention window. The size of contention window is specified by the minimum and maximum value of N. The transmitting entity has to vary the size of the contention window when drawing the random number N. The random number N is used in the CCA/LBT procedure to determine the duration of time that the channel is sensed to be idle before the transmitting entity transmits on the channel.

Improved systems and methods for tuning one or more parameters of a network are needed.

SUMMARY

Systems and methods for collection and reporting of Channel Occupancy (CO) statistics for network tuning are provided. In some embodiments, a method performed by a wireless device for tuning one or more parameters of a network comprises obtaining a configuration for CO measurement and reporting. The method also includes obtaining a plurality of CO measurements based on the obtained configuration for CO measurement and reporting. One or more of the plurality of CO measurements are obtained when a Radio Resource Control (RRC) state of the wireless device is RRC_INACTIVE or RRC_IDLE. One or more of the plurality of CO measurements are obtained when the RRC state of the wireless device is RRC_CONNECTED. The method also includes reporting a result of one or more of the plurality of CO measurements to a network node. This might allow improved tuning of networks (e.g., NR-U networks), such as tuning of mechanisms that are used to compensate for potential CCA/LBT failures, e.g., adaptation of measurement time windows, transmission time windows and/or number of additional transmission opportunities and dedicated resources, e.g., for various types of signaling, such as DRS, CSI-RS, SI, Paging, RACH, PUCCH and/or PDCCH. Longer windows increase the probability of successful transmission and/or measurements at higher battery consumption, and if the CCA failures are reduced, the windows can be shortened to improve battery consumption.

In some embodiments, the method further comprises adjusting one or more operational parameters of the wireless device based on the plurality of CO measurements.

In some embodiments, the one or more operational parameters comprise one or more of the group consisting of: selection of one or more bandwidth parts or sub-bands of bandwidth parts for subsequent uplink and/or downlink transmissions; and prioritization of one or more bandwidth parts or sub-bands of bandwidth parts for subsequent uplink and/or downlink transmissions.

In some embodiments, reporting the result of the one or more of the plurality of CO measurements to the network node comprises transmitting the result to the network node.

In some embodiments, obtaining the configuration for CO measurement and reporting comprises obtaining the configuration via one or more of the group consisting of: a System Information (SI) broadcast; dedicated RRC signaling; Non-Access Stratum (NAS) signaling; Short Message Service (SMS) signaling; and communication over a user plane.

In some embodiments, the configuration for CO measurement and reporting comprises one or more configuration parameters of the group consisting of: a duration over which one or more of the plurality of CO measurements should be taken; one or more time restrictions regarding when the plurality of CO measurements should be taken; a periodicity of when one or more of the plurality of CO measurements should be taken; one or more areas in which one or more of the plurality of CO measurements should be taken; one or more networks in which one or more of the plurality of CO measurements should be taken; one or more carrier frequencies, bands, and/or bandwidth parts in which one or more of the plurality of CO measurements should be taken; a bandwidth of channel monitoring used for one or more of the plurality of CO measurements; a duration over which each one of the plurality of CO measurements should be taken; a period over which one or more of the plurality of CO measurements should be taken before the report is provided to the network node; one or more CO measurement types to be used for one or more of the plurality of CO measurements; one or more parameters to be included in the report about one or more of the plurality of CO measurements; and one or more rules and/or conditions for when the report should be sent to the network node.

In some embodiments, the one or more configuration parameters are different for one or more of the group consisting of: different bandwidth parts or sub-bands of bandwidth parts; different carrier frequencies; and different networks (e.g., different public land mobile networks and different neutral host networks).

In some embodiments, the configuration for CO measurement and reporting indicates one or more times at which a nearby base station will not be transmitting, and the wireless device is configured to obtain the plurality of CO measurements when the nearby base station is not transmitting.

In some embodiments, obtaining the plurality of CO measurements comprises obtaining the plurality of CO measurements when the nearby base station is not transmitting. In some embodiments, one or more of the plurality of CO measurements are obtained in conjunction with a page monitoring function of the wireless device. In some embodiments, one or more of the plurality of CO measurements are obtained in conjunction with a serving cell quality measurement.

In some embodiments, the wireless device is configured to communicate with a base station via wireless signals provided at a first frequency; and one or more of the plurality of CO measurements occur at a second frequency that is different than the first frequency.

In some embodiments, obtaining the plurality of CO measurements comprises obtaining the plurality of CO measurements only when the wireless device reselects to the second frequency. In some embodiments, the wireless device is configured to switch a receiver from the first frequency to the second frequency to perform one or more of the plurality of CO measurements.

In some embodiments, obtaining the plurality of CO measurements comprises one or more of the group consisting of: measuring the energy within a channel frequency for a channel monitoring period and comparing the measured energy to an energy detection threshold; measuring a Received Signal Strength Indication, RSSI, within the channel frequency for the channel monitoring period and comparing the measured RSSI to a threshold; determining if a preamble has been detected during the channel monitoring period; and determining an interference level within the channel frequency for the channel monitoring period.

In some embodiments, a method performed by a network node for tuning one or more parameters of a network, the method comprising: transmitting, to a wireless device, a configuration for Channel Occupancy, CO, measurement and reporting; receiving, from the wireless device, a result of a plurality of CO measurements based on the transmitted configuration for CO measurement and reporting, where: one or more of the plurality of CO measurements are obtained when a Radio Resource Control, RRC, state of the wireless device is one of the group consisting of: RRC_INACTIVE; and RRC_IDLE; and one or more of the plurality of CO measurements are obtained when the RRC state of the wireless device is RRC_CONNECTED.

In some embodiments, the method further comprises adjusting one or more operational parameters of the wireless device based on the plurality of CO measurements.

In some embodiments, the one or more operational parameters comprise one or more of the group consisting of: selection of one or more bandwidth parts or sub-bands of bandwidth parts for subsequent uplink and/or downlink transmissions; and prioritization of one or more bandwidth parts or sub-bands of bandwidth parts for subsequent uplink and/or downlink transmissions.

In some embodiments, transmitting the configuration for CO measurement and reporting comprises transmitting the configuration via one or more of the group consisting of: a SI broadcast; dedicated RRC signaling; NAS signaling; SMS signaling; and communication over a user plane.

In some embodiments, the configuration for CO measurement and reporting comprises one or more configuration parameters of the group consisting of: a duration over which one or more of the plurality of CO measurements should be taken; one or more time restrictions regarding when the plurality of CO measurements should be taken; a periodicity of when one or more of the plurality of CO measurements should be taken; one or more areas in which one or more of the plurality of CO measurements should be taken; one or more networks in which one or more of the plurality of CO measurements should be taken; one or more carrier frequencies, bands, and/or bandwidth parts in which one or more of the plurality of CO measurements should be taken; a bandwidth of channel monitoring used for one or more of the plurality of CO measurements; a duration over which each one of the plurality of CO measurements should be taken; a period over which one or more of the plurality of CO measurements should be taken before the report is provided to the network node; one or more CO measurement types to be used for one or more of the plurality of CO measurements; one or more parameters to be included in the report about one or more of the plurality of CO measurements; and one or more rules and/or conditions for when the report should be sent to the network node.

In some embodiments, the one or more configuration parameters are different for one or more of the group consisting of: different bandwidth parts or sub-bands of bandwidth parts; different carrier frequencies; and different networks (e.g., different public land mobile networks and different neutral host networks).

In some embodiments, the configuration for CO measurement and reporting indicates one or more times at which a nearby base station will not be transmitting, and the wireless device is configured to obtain the plurality of CO measurements when the nearby base station is not transmitting.

In some embodiments, the plurality of CO measurements is obtained when the nearby base station is not transmitting. In some embodiments, one or more of the plurality of CO measurements are obtained in conjunction with a page monitoring function of the wireless device. In some embodiments, one or more of the plurality of CO measurements are obtained in conjunction with a serving cell quality measurement.

In some embodiments, the wireless device is configured to communicate with a base station via wireless signals provided at a first frequency; and one or more of the plurality of CO measurements occur at a second frequency that is different than the first frequency. In some embodiments, the plurality of CO measurements is obtained only when the wireless device reselects to the second frequency.

In some embodiments, the method further comprises: forwarding the result of the plurality of CO measurements to an additional network node. In some embodiments, the method also comprises: adjusting one or more operational parameters of the network node based on the plurality of CO measurements.

In some embodiments, the method further comprises: receiving one or more network adjustment parameters from the additional network node, wherein the one or more network adjustment parameters are based on the plurality of CO measurements; and adjusting one or more operational parameters of the network node based on the one or more network adjustment parameters.

In some embodiments, the network operates at least partially in an unlicensed spectrum. In some embodiments, the network operates at least partially in a Listen Before Talk (LBT) mode of operation.

In some embodiments, a wireless device for tuning one or more parameters of a network, the wireless device comprising: one or more processors; and memory comprising instructions to cause the wireless device to: obtain a configuration for CO measurement and reporting; obtain a plurality of CO measurements based on the obtained configuration for CO measurement and reporting, where: one or more of the plurality of CO measurements are obtained when a RRC state of the wireless device is one of the group consisting of: RRC_INACTIVE; and RRC_IDLE; and one or more of the plurality of CO measurements are obtained when the RRC state of the wireless device is RRC_CONNECTED; and report a result of one or more of the plurality of CO measurements to a network node. In some embodiments, the instructions further cause the wireless device to perform any of the methods disclosed herein.

In some embodiments, a network node for tuning one or more parameters of a network, the network node comprising: one or more processors; and memory comprising instructions to cause the network node to: transmit, to a wireless device, a configuration for CO measurement and reporting; receive, from the wireless device, a result of a plurality of CO measurements based on the transmitted configuration for CO measurement and reporting, where: one or more of the plurality of CO measurements are obtained when a RRC state of the wireless device is one of the group consisting of: RRC_INACTIVE; and RRC_IDLE; and one or more of the plurality of CO measurements are obtained when the RRC state of the wireless device is RRC_CONNECTED. In some embodiments, the instructions further cause the network node to perform any of the methods disclosed herein.

BRIEF DESCRIPTION OF THE DRAWINGS

The accompanying drawing figures incorporated in and forming a part of this specification illustrate several aspects of the disclosure, and together with the description serve to explain the principles of the disclosure.

FIG. 3 illustrates a method performed by a wireless device for tuning one or more parameters of a network, according to some embodiments of the present disclosure;

FIG. 4 illustrates a method performed by a network node for tuning one or more parameters of a network, according to some embodiments of the present disclosure;

FIGS. 12 through 16 illustrate a communication system including a host computer, according to some other embodiments of the present disclosure.

DETAILED DESCRIPTION

The embodiments set forth below represent information to enable those skilled in the art to practice the embodiments and illustrate the best mode of practicing the embodiments. Upon reading the following description in light of the accompanying drawing figures, those skilled in the art will understand the concepts of the disclosure and will recognize applications of these concepts not particularly addressed herein. It should be understood that these concepts and applications fall within the scope of the disclosure.

Radio Node: As used herein, a "radio node" is either a radio access node or a wireless device.

Radio Access Node: As used herein, a "radio access node" or "radio network node" is any node in a radio access network of a cellular communications network that operates to wirelessly transmit and/or receive signals. Some examples of a radio access node include, but are not limited to, a base station (e.g., a New Radio (NR) base station (gNB) in a Third Generation Partnership Project (3GPP) Fifth Generation (5G) NR network or an enhanced or evolved Node B (eNB) in a 3GPP Long Term Evolution (LTE) network), a high-power or macro base station, a low-power base station (e.g., a micro base station, a pico base station, a home eNB, or the like), and a relay node.

Core Network Node: As used herein, a "core network node" is any type of node in a core network. Some examples of a core network node include, e.g., a Mobility Management Entity (MME), a Packet Data Network Gateway (P-GW), a Service Capability Exposure Function (SCEF), or the like.

Wireless Device: As used herein, a "wireless device" is any type of device that has access to (i.e., is served by) a cellular communications network by wirelessly transmitting and/or receiving signals to a radio access node(s). Some examples of a wireless device include, but are not limited to, a User Equipment device (UE) in a 3GPP network and a Machine Type Communication (MTC) device.

Network Node: As used herein, a "network node" is any node that is either part of the radio access network or the core network of a cellular communications network/system.

Note that the description given herein focuses on a 3GPP cellular communications system and, as such, 3GPP terminology or terminology similar to 3GPP terminology is oftentimes used. However, the concepts disclosed herein are not limited to a 3GPP system.

Note that, in the description herein, reference may be made to the term "cell"; however, particularly with respect to 5G NR concepts, beams may be used instead of cells and, as such, it is important to note that the concepts described herein are equally applicable to both cells and beams.

Figure 1:
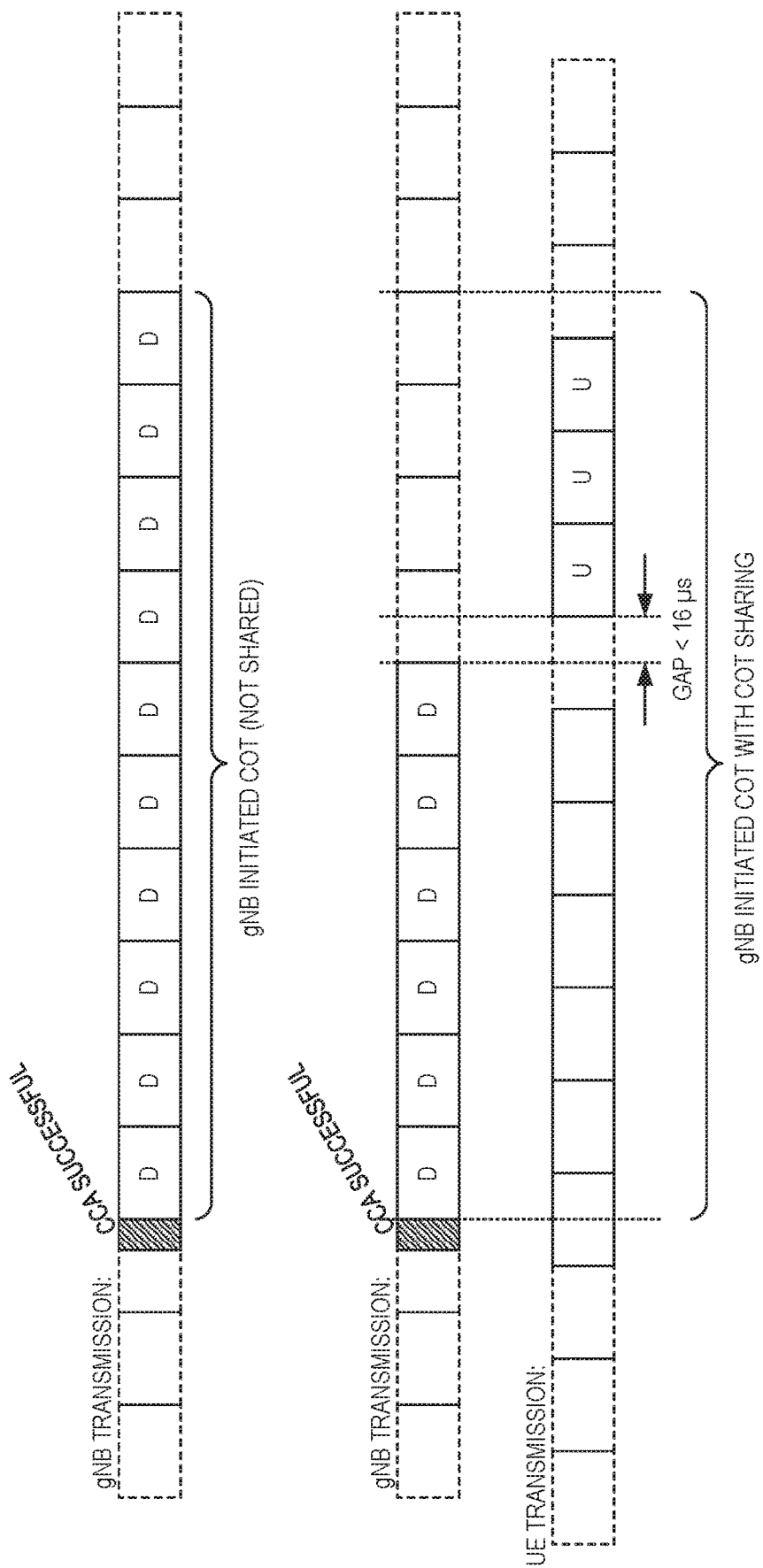
FIG. 1 illustrates a transmission opportunity both with and without Channel Occupancy Time (COT) sharing after a successful Clear Channel Assessment (CCA) at the radio network node, according to some embodiments of the present disclosure.
Figure 2:
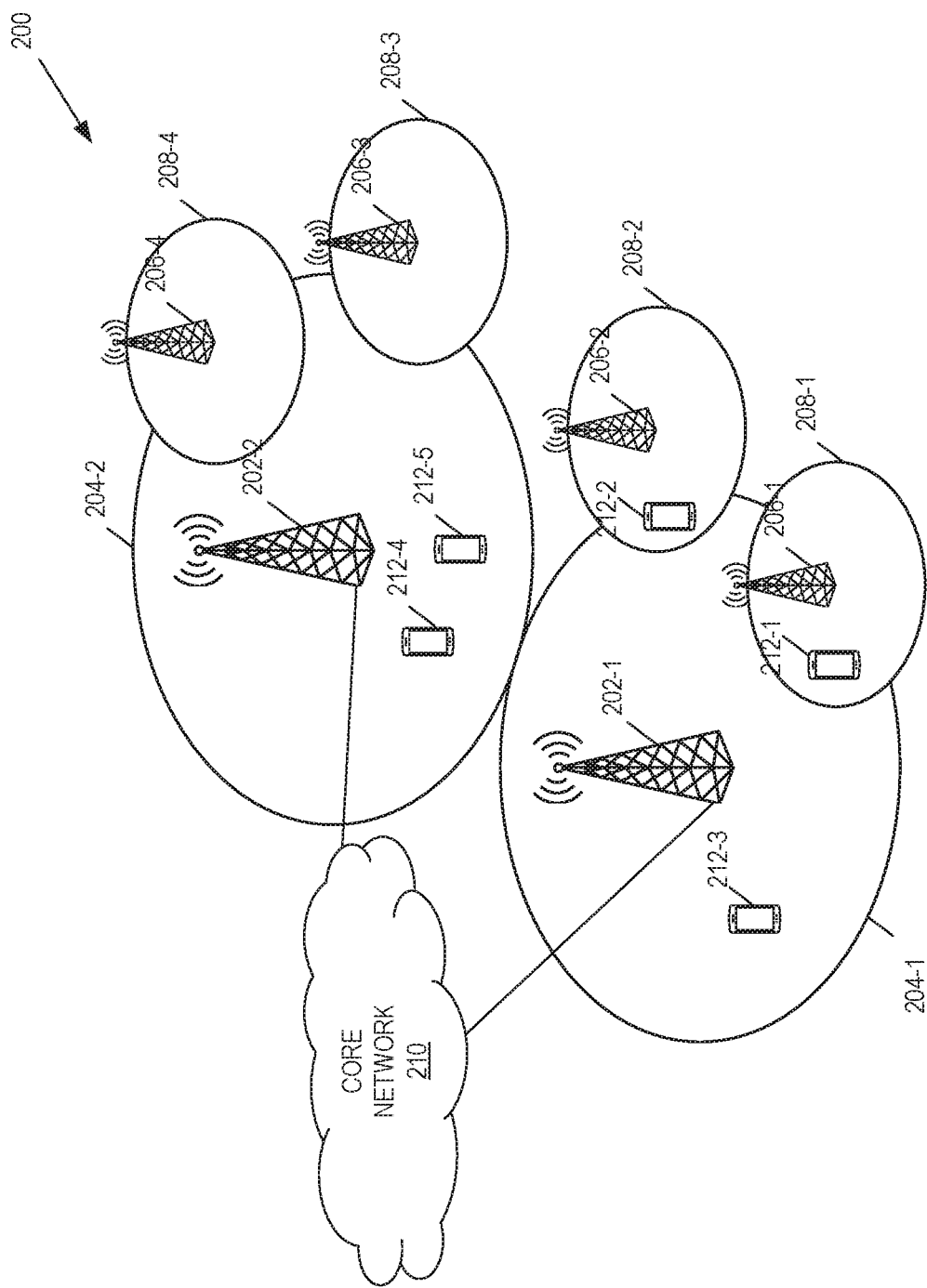
FIG. 2 illustrates one example of a cellular communications network, according to some embodiments of the present disclosure.

FIG. 2 illustrates one example of a cellular communications network 200 according to some embodiments of the present disclosure. In the embodiments described herein, the cellular communications network 200 is a 5G NR network. In this example, the cellular communications network 200 includes base stations 202-1 and 202-2, which in LTE are referred to as eNBs and in 5G NR are referred to as gNBs, controlling corresponding macro cells 204-1 and 204-2. The base stations 202-1 and 202-2 are generally referred to herein collectively as base stations 202 and individually as base station 202. Likewise, the macro cells 204-1 and 204-2 are generally referred to herein collectively as macro cells 204 and individually as macro cell 204. The cellular communications network 200 may also include a number of low power nodes 206-1 through 206-4 controlling corresponding small cells 208-1 through 208-4. The low power nodes 206-1 through 206-4 can be small base stations (such as pico or femto base stations) or Remote Radio Heads (RRHs), or the like. Notably, while not illustrated, one or more of the small cells 208-1 through 208-4 may alternatively be provided by the base stations 202. The low power nodes 206-1 through 206-4 are generally referred to herein collectively as low power nodes 206 and individually as low power node 206. Likewise, the small cells 208-1 through 208-4 are generally referred to herein collectively as small cells 208 and individually as small cell 208. The base stations 202 (and optionally the low power nodes 206) are connected to a core network 210.

The base stations 202 and the low power nodes 206 provide service to wireless devices 212-1 through 212-5 in the corresponding cells 204 and 208. The wireless devices 212-1 through 212-5 are generally referred to herein collectively as wireless devices 212 and individually as wireless device 212. The wireless devices 212 are also sometimes referred to herein as UEs.

The below embodiments are described in the context of NR operation in unlicensed spectrum (NR-U). However, the present disclosure is not limited to NR-U scenarios. They are also applicable to other unlicensed operation scenarios such as LTE LAA/eLAA/feLAA or Wi-Fi.

There currently exist certain challenges. In order to make appropriate use of the toolbox of measures to counteract CCA failures, both short term and long term, the network needs to have access to reasonably detailed and accurate information of the Channel Occupancy (CO) situation in the vicinity and operating frequencies of each of the network's cells. For short term actions, a gNB can rely on CO measurements performed by the gNB itself and on reports of CO measurement results performed by UEs in RRC_CONNECTED state (such mechanisms have been specified for LTE-LAA). For the more long-term aspects, however, there are no mechanisms. A complement to the RRC_CONNECTED state measurement reports are desirable in order to provide the network with comprehensive long-term statistics from as many locations as possible, including cell edge locations as well as areas closer to cell centers. Certain aspects of the present disclosure and their embodiments may provide solutions to the aforementioned or other challenges.

Systems and methods for collection and reporting of CO statistics for network tuning are provided. In some embodiments, a method performed by a wireless device (900) for tuning one or more parameters of a network is illustrated in FIG. 3. The method comprises obtaining a configuration for CO measurement and reporting (step 300). The method also includes obtaining a plurality of CO measurements based on the obtained configuration for CO measurement and reporting (step 302). One or more of the plurality of CO measurements are obtained when a Radio Resource Control (RRC) state of the wireless device (900) is RRC_INACTIVE or RRC_IDLE. One or more of the plurality of CO measurements are obtained when the RRC state of the wireless device (900) is RRC_CONNECTED. The method also includes reporting a result of one or more of the plurality of CO measurements to a network node (e.g., 600) (step 304). In some embodiments, the wireless device optionally adjusts one or more operational parameters of the wireless device (900) based on the plurality of CO measurements (step 306). In some embodiments, the wireless device (900) determines these adjustments. In some embodiments, these adjustments are received from the network node or another network node.

In some embodiments, a method performed by a network node (e.g., 600) for tuning one or more parameters of a network is illustrated in FIG. 4. The method includes transmitting, to a wireless device (900), a configuration for CO measurement and reporting (step 400). The method also includes receiving, from the wireless device (900), a result of a plurality of CO measurements based on the transmitted configuration for CO measurement and reporting (step 402). One or more of the plurality of CO measurements are obtained when a Radio Resource Control, RRC, state of the wireless device (900) is RRC_INACTIVE or RRC_IDLE. One or more of the plurality of CO measurements are obtained when the RRC state of the wireless device (900) is RRC_CONNECTED. In some embodiments, the network node optionally adjusts one or more operational parameters of the wireless device (900) based on the plurality of CO measurements (step 404). In some embodiments, the network node optionally adjusts one or more operational parameters of the network node based on the plurality of CO measurements. In some embodiments, the network node determines these adjustments. In some embodiments, these adjustments are received from another network node, e.g., a nearby base station or a core network node.

Some embodiments include configuring UEs to measure and record the CO on a regular basis irrespective of the UE RRC state (i.e., RRC_INACTIVE and/or RRC_IDLE and/or RRC_CONNECTED) and later report the collected measurement results to the NR-U network. In some embodiments, the CO to measure and report may be direction or beam specific (e.g., differentiation of directions within the same cell) or may be direction or beam agnostic.

In some embodiments, accumulated received CO statistics enable the network to improve the tuning of the network, e.g., tuning of mechanisms that are used to compensate for potential CCA/LBT failures, e.g., adaptation of measurement windows, transmission time windows, one or more bandwidth part configuration parameters, and/or number of additional transmission opportunities and dedicated resources, e.g., for various types of signaling, such as Discovery Reference Signals (DRSs), Channel State Information Reference Signals (CSI-RSs), SI, Paging, Random Access Channels (RACHs), PUCCHs and/or PDCCHs, as well as adapting configuration of serving cells for a UE (including deactivation/deconfiguration of problematic serving cells subject to CCA/LBT failures, change of Primary Secondary Cells (PSCells) through handover procedures, deactivation/deconfiguration of problematic BWPs subject to CCA/LBT failures). Other long-term adaptations could include one or more of the following:

Changing of carrier frequency for a cell.
Barring of specific cells or carrier frequencies.
Adapting the mobility parameters, e.g., cell selection offsets, cell selection priorities for moving traffic load between cells, e.g., from a cell with high CCA failure rate (higher load) to a cell with lower CCA failure rate (lower load).
Adapting antenna patterns (e.g., cell shaping, antenna downtilt) to adapt the coverage of a cell to admit less traffic in a highly loaded cell with high CCA failure rate or to reduce the interference and channel occupancy caused in neighbor cells.
Adaptation of beam configuration (e.g., increase or reduce the number of beams in a cell depending on the statistics).
Adaptation of transmit powers of cell coverage-defining signals/channels, e.g., Synchronization Signal (SS)/Physical Broadcasting Channel (PBCH) blocks, Physical Random Access Channel (PRACH) to adapt the coverage of a cell to admit less traffic in a highly loaded cell with high CCA failure rate.
Adapting DRS configuration (e.g., periodicity, bandwidth), SS/PBCH blocks configuration (e.g., periodicity, number of blocks per burst—e.g., longer periodicity when the failure rate is below a threshold, more SS/PBCH blocks when the failure rate is above a threshold).
Adapting SMTC window configuration (e.g., increase the Synchronization Signal Block (SSB)-based Radio Resource Management (RRM) Measurement Time Configuration (SMTC) window periodicity when the failure rate is above a threshold).
Adapting bandwidth part configuration.
Adaptation of numerology and/or bandwidth of one or more channels or signals.

In addition to the more long-term targeted use cases, UEs in RRC_CONNECTED state could be used for CO measurement and reporting, which especially may be beneficial for short-term, in particular UE specific, adaptations, such as selection/prioritization of BWP or sub-band of a BWP for subsequent UL and/or DL transmissions.

Some embodiments include numerous configuration options, e.g., involving CO measurement mechanisms, when to report and, in particular, what to include in the reports. In some embodiments, the network is operating in an unlicensed spectrum, e.g., NR-U, and the network configures UEs to measure and record the CO on a regular basis in RRC_INACTIVE and/or RRC_IDLE state and later report the collected measurement results to the network. As a result of the received CO statistics (accumulated from multiple UEs in some embodiments) the network can take actions to tune the network, e.g., through tuning of mechanisms that are used to compensate for potential CCA/LBT failures, e.g., adaptation of time windows and/or timers and/or number of additional transmission opportunities and dedicated resources, e.g., for various types of signaling, such as DRS, CSI-RS, SI, Paging, RACH, PUCCH and/or PDCCH. Other long-term adaptations could include changing of carrier frequency for a cell, adaptation of cell reselection parameters, adaptation of transmit powers of cell coverage-defining signals/channels, etc.

Also UEs in RRC_CONNECTED state could be used for CO measurement and reporting, which is beneficial for short-term, in particular UE specific adaptations, such as selection/prioritization of BWP for subsequent UL and/or DL transmissions.

The solution includes numerous configuration options, e.g., involving CO measurement mechanisms, when to report and, in particular, what to include in the reports.

Figure 5:
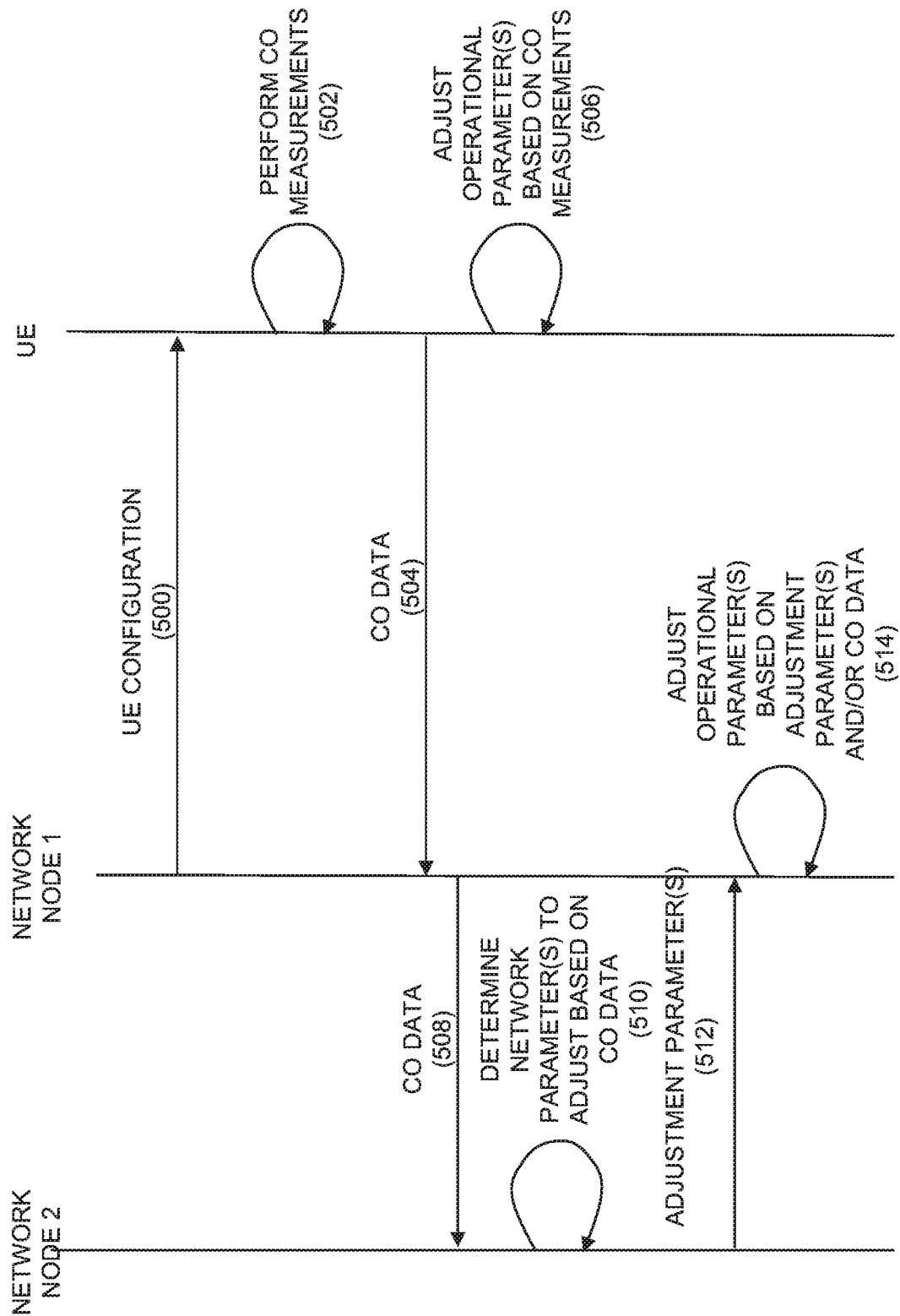
FIG. 5 illustrates a call flow diagram illustrating a method implemented in a communication system, according to some embodiments of the present disclosure.

FIG. 5 is a call flow diagram illustrating a method implemented in a communication system, in accordance with one embodiment. The communication system includes a first network node, a second network node, and one or more UEs. An exemplary description of the UEs and the network nodes is included above with respect to FIGS. 11 and 12. In step 500 (which may be optional), the first network node provides a configuration to the UE. As discussed above, the configuration causes the UE to measure and record CO on a regular basis irrespective of the UE RRC state (i.e., RRC_INACTIVE and/or RRC_IDLE and/or RRC_CONNECTED). Accordingly, in step 502 (which may be optional), the UE performs one or more CO measurements. The configuration further causes the UE to report the results of the CO measurements back to the network via the first network node. Accordingly, in step 504 (which may be optional), the UE provides CO data to the first network node. While the CO data is shown being provided back to the same network node that configured the UE to perform the CO measurements, the CO data could also be provided back to a different network node or could be provided back to the network in any suitable way. The configuration may also cause the UE to change one or more operational parameters based on the CO measurements. Accordingly, in step 506 (which may be optional), the UE adjusts one or more of its operational parameters based on the CO measurements. The one or more operational parameters may include any of those discussed above. The configuration may include details regarding how and when to take CO measurements, how and when CO measurements should be reported to the network, and the like as discussed in detail herein. In step 508 (which may be optional), the first network node provides the CO data to a second network node. In step 510

(which may be optional), the second network node determines one or more network parameters to adjust based on the CO data. While the same network node receiving the CO data is shown determining the network parameters to adjust based on the CO data, a different network node than the one receiving the CO data may be used to determine which network parameters to adjust. In step 512 (which may be optional), the second network node provides one or more adjustment parameters to the first network node. In step 514 (which may be optional), the first network node adjusts one or more of its operational parameters based on the adjustment parameters provided from the network node and/or the CO data itself. The foregoing process may take place simultaneously across a number of network nodes and UEs. The network nodes may thus receive CO data from a number of UEs. The CO data from multiple UEs may be used to determine the network parameters to adjust. As discussed above, this may improve the performance of the network. In some embodiments, the first network node may be a base station and the second network node may be a core network node. Further, the functionality of the first network node and the second network node may be provided by a single network node or by more than two network nodes. The UE may more broadly be a wireless device. The one or more network parameters to adjust may include any of those discussed above.

Certain embodiments may provide one or more of the following technical advantage(s). The proposed solution allows improved tuning of NR-U networks, such as tuning of mechanisms that are used to compensate for potential CCA/LBT failures, e.g., adaptation of measurement time windows, transmission time windows and/or number of additional transmission opportunities and dedicated resources, e.g., for various types of signaling, such as DRS, CSI-RS, SI, Paging, RACH, PUCCH and/or PDCCH. Longer windows increase the probability of successful transmission and/or measurements at higher battery consumption, and if the CCA failures are reduced, the windows can be shortened to improve battery consumption.

Other long-term adaptations could include changing of carrier frequency for a cell, adaptation of mobility parameters, adaptation of antenna patterns, adaptation of cell coverage defining reference signals/channels. This allows shifting to cells with lower channel occupancy and thus improving the CCA success rate and/or increasing Signal to Interference Plus Noise Ratio (SINR). In the short term, reported CO data can be used to select/prioritize BWP or sub-band of a BWP with lower CO for subsequent UL and/or DL transmissions. This would increase the probability of successful transmissions in terms of CCA success rate and/or reduce the interference from other nodes, devices or systems.

Configuration Measurement and Reporting

For long-term, comprehensive CO statistics collection it may be more appropriate to utilize UEs in RRC_INACTIVE and RRC_IDLE state (which are likely to be the majority of the UEs) instead of (only) UEs in RRC_CONNECTED state. To this end, UEs could be configured by the network (most likely the gNB, e.g., using RRC signaling) to perform CO measurements in RRC_INACTIVE and/or RRC_IDLE state and/or RRC_CONNECTED and to report the collected data according to certain rules or triggering-events and/or upon request from the network. For UEs that are to perform these operations in RRC_INACTIVE or RRC_IDLE state, the configuration could be performed when the UE is switched from RRC_CONNECTED to RRC_INACTIVE or RRC_IDLE state or at any time while the UE is in RRC_CONNECTED state. This mechanism could be integrated with the logged measurement reporting (e.g., for Minimization of Drive Tests (MDTs)) framework (which is a part of the LTE standard and is expected to be specified for NR too), or with the In-Device Coexistence (IDC) framework.

CO Measurements and Reporting Quantities

When performing CO measurements for this purpose, a UE could determine whether the channel is occupied in different ways. One way is to use an energy detection threshold. A similar approach is the Received Signal Strength Indicator (RSSI)-based approached specified for LTE-LAA, e.g., the RSSI of a given frequency is measured over a certain channel monitoring period. (LTE-LAA supports measurements of averaged RSSI and CO for measurement reports. The CO is defined as percentage of time that RSSI was measured above a configured threshold. For this purpose, an RSSI measurement timing configuration (RMTC) includes a measurement duration (e.g., 1-5 ms) and a period between measurements (e.g., {40, 80, 160, 320, 640} ms).) In order to obtain consistent CO measurements from different device implementations, the device measurement procedure may follow that described in 3GPP TS 36.213 section 15.1.1 or ETSI HS 301 893 with respect to sensing slot durations and slot idle/occupied determination. An optional additional condition for clear channel (i.e., non-occupied channel) determination could be that no Wi-Fi preamble has been detected during the channel monitoring period (if applicable, e.g., if NR-U UEs search for Wi-Fi preambles).

Another useful reporting criterion is the interference level (excluding the serving cell transmission) evaluated from the serving cell's discovery reference signal (DRS) transmission over a certain channel monitoring period. Because the UE anyway measures the serving cell's signal strength (SS-Reference Signal Received Power (RSRP)) and signal quality (SS-Reference Signal Received Quality (RSRQ) or SS-SINR) for cell reselection purposes, it can derive the interference level without performing any additional measurements. This interference level is a measure of hidden node transmissions and/or amount of colliding transmissions, because ideally other nodes should not transmit during the DRS transmission, if they can hear the transmission.

Measurement and Reporting Configuration

1. Basic Configuration of Rules and Conditions for Collection and Reporting of CO Data The CO measurement configuration can be provided via the following alternative configurations:

Via System Information (SI) broadcast signaling for UEs in RRC_INACTIVE and RRC_IDLE state (and possibly also UEs in RRC_CONNECTED state).

Via dedicated RRC signaling for UEs in RRC_CONNECTED state. In this case, the CO measurement configuration may be conveyed via a logged measurement framework (e.g., for MDT) in dedicated RRC signaling (via the LoggedMeasurementConfiguration message). Alternatively, the CO measurement configuration may be provided as part of the IDC configuration, e.g., with a flag within the IDC configuration indicating that the UE shall report CO measurement.

To this end, a UE in RRC_CONNECTED state could in principle at any time be configured for collection and reporting of CO statistics, but it in any case, for configuration of CO data collection in RRC_INACTIVE and/or RRC_IDLE state, the configuration would not be activated until the UE is switched to RRC_INACTIVE or RRC_IDLE state.

In general, the configuration could include instructions concerning both measurement of CO and reporting of the collected data.

As a baseline, the CO measurement configuration can reuse a couple of relevant parameters from the logged measurement framework, including a duration (loggingDuration), a logging periodicity (loggingInterval) and an area configuration (areaConfiguration). These configuration aspects are relevant also for CO measurement (data collection) and reporting.

A non-comprehensive list of configuration possibilities includes:

Duration. This could mean different things:
  The duration during which the configuration is valid, starting at the time of configuration (this is the meaning of the loggingDuration parameter in LTE). (Note that the collected data is not automatically discarded when the configuration is not valid anymore, but the collection of CO measurement results ends.)
  The duration of the effective accumulated time when the configuration is active (e.g., when the UE is in RRC_INACTIVE and/or RRC_IDLE state) during which the configuration is valid.
Time restrictions for the CO measurements, e.g., the measurements shall be performed only in specific slots or subframes which could be indicated via a bitmap or with offset/periodicity with respect to SFN=0 or with respect to the point in time in at which the CO measurement is configured in UE. The time restriction for the CO measurement may also be such that the CO measurement is only performed in the slots in which the UE is scheduled for DL reception and/or for UL transmission. Time restrictions may also be indicated by timestamp(s) and/or rules which indicate that measurements shall occur, e.g., every weekday during office hours or peak hours, but not during other times.
Periodicity of the CO measurements.
Starting points of the periodicity period. This could be configured in terms of an offset in relation to a certain System Frame Number (SFN) value fulfilling SFN modulo CO measurement period(expressed in number of radio frames)=X, where X is an integer, expressed in number of radio frames, in the range 0 to the CO measurement period. The offset could have a frame, slot or symbol granularity. The starting point can also be configured as an offset to the UE's paging occasion and/or Discovery Reference Signal Measurement Timing Configuration (DMTC) configuration.
The area in which the CO measurement configuration is valid. This could be configured as:
  A cell portion or a certain direction of a cell or a beam or coverage area of one or more SS/PBCH block(s) with a specific index(es).
  A list of cells.
  A list of gNBs.
  A list of RAN Areas.
  A list of Tracking Areas
  A combination of two or more of the above.
Public Land Mobile Networks (PLMN(s)) in which the CO measurement configuration is valid.
Neutral Host Networks (NHNs) (generalization of PLMN used in MulteFire) in which the CO measurement configuration is valid.
Carrier frequencies and/or bands (e.g., the 5 GHz band or the 6 GHz band or both) in which the CO measurement configuration is valid.
BWP(s), sub-band(s) of a BWP or channel(s) (e.g., in terms of 20 MHz chunks) in which the CO measurement configuration is valid.
Bandwidth of the channel monitoring used for the CO measurements.
Channel monitoring duration for each CO measurement sample, i.e., the period of time during which the UE shall measure the channel before determining whether the channel is clear or occupied.
Accumulated channel monitoring period before generating a CO measurement report.
CO measurement type, e.g., RSSI based or other energy or power detection threshold-based method.
Condition for a channel to be determined as "occupied", e.g.:
  Threshold for an RSSI based method.
  Threshold for an energy detection-based method.
Other detailed measurement configuration, e.g., RSSI measurement configuration (e.g., RMTC), DRS measurement configuration (e.g., SMTC), subcarriers and/or symbols to monitor for the CO measurements.
Report quantity/quantities representing the CO measurement results (of which one or a combination could be reported):
  Occupied/clear ratio.
  Occupied/total number of samples ratio.
  Clear/occupied ratio.
  Clear/total number of samples ratio.
  Number of samples with result "occupied".
  Number of samples with result "clear".
  Number of samples with result "occupied" for a given number of samples using a simple counter.
  Number of samples with result "clear" for a given number of samples using a simple counter.
  Exponential average of any of the ratios above, e.g., the occupied/total number of samples ratio. This could be useful when the measurements continue during a long time period.
  A leaky bucket calculation of any of the ratios above. This could be useful when the measurements continue during a long time period.
  Any of the above, binned or categorized by RAT transmission types, e.g., 3GPP NR-U, 3GPP LAA, IEEE 802.11 and unknown.
Report content (where one, a subset or all of the examples listed below could be included in a report) (note that the report content could also be determined by instructions in a message or IE requesting a report from the UE):
  Report quantity representing the CO measurement results (e.g., occupied/total number of samples ratio).
  Report quantity representing the CO measurement results in occupied/idle sensing slots, where slot durations and idle/occupied determination follows the definitions in 3GPP TS 36.213 section 15.1.1 or ETSI HS 301 893.
  Report quantity in terms of "occupied" and/or "clear" for each sample in which CO measurement is performed, where occupied/clear is determined on the basis of whether the CO measurement for a specific sample within a monitoring window is above/below an energy threshold, wherein the energy threshold is specified as per above embodiments. The occupied/clear indication may possibly be provided in a compressed form or as a bitmap with one bit for each sample (where, e.g., a 0 could indicate "clear" and a "1" could indicate "occupied"). Specifically, the bits in the bitmap may be associated only with the specific subframes or slots in which the UE has performed a CO measurement within a CO measurement period, thereby excluding the subframes/slots in which the UE has not performed CO measurement (e.g., no measurement samples collected).

Total number of samples.

Average received power during channel monitoring.

Average received energy per sample.

Received power or energy for each sample.

Duration during which the measurements have been performed.

Timestamp for each sample.

Cell ID (as global cell ID or physical cell ID (PCI)) of the UE's serving cell (i.e., on which the UE was camping) for each sample.

Index of the strongest beam or SS/PBCH block of the UE's serving cell (i.e., on which the UE was camping) for each sample (reported together with the cell ID (i.e., global cell ID or physical cell ID (PCI)).

List of the cell IDs (as global cell ID or physical cell ID (PCI)) of the cells in which the CO measurements have been performed.

Geographical coordinates (if available, e.g., from a Global Positioning System receiver in the UE) for each sample (or possibly for each sample for which the result was "occupied").

Area configuration (which may be useful to report in case the UE reports in another cell/gNB than in which the configuration was received).

Bandwidth of the channel monitoring used for the CO measurements.

Channel monitoring duration for each CO measurement.

CO measurement type, e.g., RSSI based or other energy detection threshold-based method.

Any of the above, listed per cell in which CO measurement(s) have (has) been performed.

Any of the above, listed per BWP, sub-band of a BWP or channel in which CO measurement(s) have (has) been performed.

Any of the above, listed per carrier frequency on which CO measurement(s) have (has) been performed.

Any of the above, listed per PLMN or NHN in which CO measurement(s) have (has) been performed.

The UE's receiver capabilities. For instance, the sensitivity of the receiver or the receiver's ability to detect power/energy on the monitored channel may impact how the reported data is processed (e.g., in relation to data reported from UEs with other receiver capabilities).

Report quantity representing the CO measurement results, possibly combined with any of the above, binned or categorized by RAT transmission types, e.g., 3GPP NR-U, 3GPP LAA, IEEE 802.11 and unknown.

Scope of the report content (note that this also could be determined by instructions in a message or IE requesting a report from the UE):

Only data collected when a certain SS/PBCH block (beam) was the strongest SS/PBCH block (beam) perceived by the UE. The concerned SS/PBCH block may have been configured.

Only data collected when the strongest SS/PBCH block (beam), as perceived by the UE, belonged to a specific subset of beams or SS/PBCH blocks. The concerned subset of beams or SS/PBCH blocks may have been configured.

Only data collected when the strongest SS/PBCH block (beam), as perceived by the UE, belonged to a subset of beams or SS/PBCH blocks related to the direction (or opposite direction) in which the report is transmitted. The concerned subset of beams or SS/PBCH blocks may have been configured.

Only data collected using a receive beam directed in (i.e., listening to transmissions from) the opposite direction as the report is transmitted in. (To clarify, this means that if the report is transmitted in the direction towards point A (with some beam angle margin around A), the report contains only data collected using a receive beam directed to receive transmissions from point A (with some beam angle margin around A).) The concerned beam direction may have been configured.

Only data collected in the cell in which the report is transmitted.

Only data collected in the cell in which the report is transmitted and its neighbor cells.

Only data collected in the cells controlled by the gNB to which the report is transmitted.

Only data collected in the cells controlled by the gNB to which the report is transmitted and its neighbor cells.

Only data collected on the carrier frequency of the cell in which the report is transmitted.

Only data collected on one or more certain BWP(s), sub-band(s) of BWP(s) or channel(s) should be reported.

Only data collected in the PLMN(s) or NHN(s) supported by the cell in which the report is transmitted.

Data collected in any cell, on any carrier frequency and in any PLMN or NHN

Only data collected in the PLMN or NHN the UE is active in when the report is transmitted.

Only data collected during the latest time period T. This could be combined with any of the above.

Rules/conditions for when reports should be sent:

Periodic (periodicity/interval should be configured). This could mean that:

The UE should enter RRC_CONNECTED state and transmit a report every time a reporting interval ends (immediate reporting).

The UE should report the first time it enters RRC_CONNECTED state after the end of each reporting interval (delayed reporting).

Event-triggered reporting. When the event occurs/triggers, the UE should either send a report the next time the UE enters RRC_CONNECTED state (delayed reporting) or immediately enter RRC_CONNECTED state and send a report (immediate reporting). Possible triggering events:

The quantity representing the CO measurement results exceeds or goes below a configured threshold. E.g.:

The occupied/total number of samples ratio exceeds a threshold.

The occupied/clear ratio exceeds a threshold.

The clear/total number of samples ratio goes below a threshold.

A certain number of samples have been collected.

The first that occurs of any combination of the above or when a combination of any of the above is fulfilled, e.g., that the occupied/total number of samples ratio exceeds a threshold and the UE has collected a minimum number of samples. (This may be an attractive alternative for event-based triggering.)

A certain time elapses after the first record of the log, e.g., when the UE is not required to store the information longer than a certain time (e.g., 48 hours) and this time is approaching (e.g., less than a threshold time period is remaining before this time is exceeded).

A combination of periodic and event triggered reporting, e.g., report when an event triggers a report but no more than the time of one periodic reporting interval should elapse between two reports (excluding waiting time until the UE enters RRC_CONNECTED state the next time in case delayed reporting is used).

Every time the UE enters RRC_CONNECTED state.

Upon request from the network (in the logged measurement framework of LTE, a report can be requested in the UEInformationRequest message).

Per BWP, sub-band of a BWP or channel configuration. The configuration, including all or a subset of the above configuration items/examples, could be provided per BWP/channel (or per set of BWPs/channels). Then different configurations could be provided for different BWPS/channels.

Per carrier frequency configuration. The configuration, including all or a subset of the above configuration items/examples, could be provided per carrier frequency. Then different configurations could be provided for different carrier frequencies.

Per frequency band configuration. The configuration, including all or a subset of the above configuration items/examples, could be provided per frequency band. Then different configurations could be provided for different frequency bands.

Per PLMN or NHN configuration. The configuration, including all or a subset of the above configuration items/examples, could be provided per PLMN or NHN, e.g., if the UE has the possibility to collect CO data in different PLMNs or NHNs. Then different configurations could be provided for different PLMNs and/or NHNs.

2. Exclusion of Own-Cell Activity

A problem associated with CO measurements is that a UE cannot easily distinguish CO caused by activity in the UE's serving cell (henceforth also referred to as "own-cell activity"), i.e., activity in the cell on which the UE is camping while it performs the CO measurement, from CO caused by activity in neighbor cells or other networks/systems operating in the same frequency band (or BWP/channel). For the purpose of tuning the network, the network may however only be interested in CO caused by activity from other sources than the cell itself (i.e., the cell the UE's serving cell when the measurement was performed).

One approach is to eliminate this problem by letting the gNB always provide some broadcast indication to indicate when it transmits itself so that a measuring UE can ignore those timeslots in the CO measurements.

Another possible method to overcome the problem could be that the gNB periodically broadcasts a bitmap indicating planned UL/DL transmission scheduling so that the UE can avoid measuring the CO when the bitmap indicates that there will be an UL or DL transmission in the UE's own cell.

Yet another method to overcome the problem of distinguishing own-cell activity from activity in other cells or networks when measuring the CO could be cell muting. This means that the gNB refrains from scheduling any UL or DL transmission at time instants when any UE is configured to measure the CO.

Another option is to configure common CSI-RS IM resources (i.e., resources where the cell is silent in order to facilitate interference measurements) in the system information (or as part of the dedicated configuration). The serving gNB would then not transmit anything, and would not schedule any UEs to transmit anything, in REs configured as CSI-RS IM resources.

Yet another option to handle the CO source distinction problem could be to sort out the samples where CO is caused by own-cell activity retroactively ("off-line"). This could be labeled "post-compensation for own-cell activity."

Post compensation for own-cell activity could be achieved if a UE is configured to periodically measure the CO with a specific start time or other exact time reference in relation to the cell timing. Then, when a UE reports its CO measurement result, e.g., in the form of a ratio, such as the occupied/total number of samples ratio (or possibly richer information where the received power or energy is indicated per sample), the receiving gNB knows exactly at what time instances the UE has measured the CO in the cell, provided that the UE only reports the CO data collected in cells controlled by the gNB receiving the report. If the UE reports in another same cell than the cell in which it was configured, or to another gNB than the gNB that configured the UE, then the UE also has to indicate the time of the first measurement and the measurement periodicity in the report (and possibly the total number of samples or the duration during which the measurement results were collected). All or parts of this information may also be provided when reporting to the same gNB as configured the UE, if not all the critical information, in the form of the time of the first measurement, the measurement periodicity and to total number of samples is unambiguously known by the gNB (for instance, the time of the first measurement may be unknown to the gNB).

Knowing exactly when the UE has measured the CO allows the gNB to compensate the reported result for the own-cell activity, i.e., modifying it to remove the impact of the own-cell activity. This requires that the gNB has recorded its own transmission/reception history. When this is fulfilled, the gNB will know exactly on how many sampling instances there was own-cell activity and can compensate for that. For example, let's say that the UE reports a CO ratio (in terms of occupied/total number of samples ratio) of 0.4 for 100 samples (supposedly meaning that the channel was occupied for 40 out of the 100 samples). If the gNB determines that during 30 of those 40 samples there was own-cell activity, the gNB can remove those samples from the calculation and calculate that the channel was occupied for 10 out of 70 remaining samples (i.e., the "non-own-cell-channel-occupancy-ratio" was 0.14).

One could consider whether removing samples in this way is the optimal way to compensate for own-cell activity or whether it would be better to just assume that there was no non-own-cell activity at those points in time and keep the full number of samples. This latter approach is however a bit risky, since the UE might have experienced a busy channel even if the own-cell activity would have been canceled (e.g., because then the CCA/LBT would have been successful for another source or the UE hears simultaneous CO from two sources which are too far from each other to cause CCA/LBT failure for each other). Furthermore, if beamforming is used, much of the own-cell activity may pass unnoticed by the UE, because communication with other UEs at the other side of the gNB may not be heard (loud enough) by the UE). Considering these aspects, it seems like samples collected while own-cell activity occurred are unreliable and for that reason the best approach may be to simply remove these samples from the calculation.

Another method for own-cell activity compensation could be that the gNB periodically broadcasts a bitmap indicating the UL/DL transmissions that were made (post-transmission indication instead of the method described further above for pre-transmission indication), so that the UE can remove those measurement samples of CO where the bitmap indicates that there was an UL or DL transmission in the UE's own cell. The UE can then correct the CO measurement and report it to the gNB. This does not depend on the cells the UE visited during the data collection or where the reporting is done.

For richer reporting, possibly for Artificial Intelligence or machine learning processing, the result of each sample could be reported in a compact form. For instance, a bitmap could be used to report the per-sample results in terms of "occupied" or "clear." Each bit in the bitmap would represent a sample and a bit set to 0 could indicate that the sample's measurement result was that the channel/medium was clear, while a bit set to 1 could indicate that the sample's measurement result was that the channel/medium was occupied (or vice versa).

3. Distribution of Different UEs' CO Measurements in Time

Distribution of different UEs' measurements in time can be useful to receive a suitable distribution of the CO samples in time. This can be achieved through configuration, e.g., configuring the same measurement period, but different phases for different UEs (e.g., using different offsets for the start of the CO measurement periods in relation to certain SFNs). On the other hand, it is beneficial for a UE in RRC_INACTIVE or RRC_IDLE state to perform measurements in combination with page monitoring in order to minimize the number/frequency of wake-ups from its energy-efficient sleep mode. For regular measurements for serving cell suitability assessment and cell reselection assessment, this circumstance is accounted for in a requirement stating that the UE must perform serving cell quality measurements at least once per paging Discontinuous Reception (DRX) cycle, but the specific times when the UE is to perform these measurements are not configured. Hence, a UE implementation is free to perform this at least one serving cell quality measurement per paging DRX cycle in conjunction with the page monitoring. Luckily, from the distribution of CO measurements point of view, different UEs have different paging occasions (i.e., the points/windows in time at which they monitor the paging channel) and are distributed to these different paging occasions based on the UE ID (the 5G-S-Temporary Mobile Subscriber Identity (TMSI) in NR). Hence, if the explicit phase shift configuration (and possibly the CO measurement period configuration too) is omitted and the UE is left to autonomously choose the times when it performs its CO measurements, the UE would most likely choose to perform these measurements in conjunction with the page monitoring (and serving cell quality measurement), which automatically would mean that different UEs' CO measurements are suitably distributed in time. As one variant, the UE could simply be configured with the requirement to perform at least one CO measurement per paging DRX cycle. This could be an explicit configuration from the network or, alternatively, the network could simply activate the CO measurements and the requirement to perform one CO measurement per paging DRX cycle (when CO measurements are configured/activated for a UE) could be specified in the standard. Yet another possibility is that the network explicitly configures the UE with a CO measurement period equal to the paging DRX cycle, but leaves to the UE to choose the phase. Yet another possibility is to mandate that if CO measurements are configured/activated for a UE in RRC_INACTIVE or RRC_IDLE state, these CO measurements should be integrated with the cell quality measurements (e.g., the serving cell quality measurements or both the serving cell quality measurements and the neighbor cell quality measurements).

4. Measurement and Reporting of CO on Other Frequencies

For CO data collection on another carrier frequency than the carrier frequency on which the UE is configured there are two options: 1) opportunistic; 2) mandated.

With opportunistic cross-carrier CO data collection, the RRC_INACTIVE/RRC_IDLE UE is configured to collect CO data on another frequency, but only if the UE anyway reselects to that frequency. When the UE is camping on the other frequency, it performs the CO measurements according to the configured instructions.

With mandated cross-carrier CO data collection, the RRC_INACTIVE/RRC_IDLE UE is configured to collect CO data on another frequency and the UE has to follow the instructions and switch its receiver to the other frequency for every CO measurement.

Another possibility could be that the network could instruct the RRC_INACTIVE/RRC_IDLE UE (in the configuration provided to the UE while the UE is in RRC_CONNECTED state) to reselect to another carrier frequency during a configured CO measurement period (i.e., a period of time during which CO sampling is performed). After the measurement period, the UE would be free to camp on any frequency. A softer way of directing the UE to another carrier frequency would be to set frequency priorities such that the concerned carrier frequency is favored (gets a positive bias) in the reselection process. These frequency priorities could be set and provided to the UE when the UE is switched to RRC_INACTIVE or RRC_IDLE state.

Another option is that the UE is instructed to perform CO measurements on frequencies it is anyway monitoring for cell reselection purposes, as configured by the InterFreqCarrierFreqList IE.

UEs in RRC_CONNECTED State

Usage of UEs in RRC_INACTIVE and RRC_IDLE state for collection and reporting of CO statistics does not exclude that RRC_CONNECTED UEs are used too, as well as the gNB's own CO measurements. Configuration of reporting of CO measurements by UEs in RRC_CONNECTED state has already been specified for LTE-LAA, as a part of the regular RRM measurement framework. This may be done for NR as well.

For cross-carrier CO measurement, an option could be that a UE in RRC_CONNECTED state could be configured with measurement gaps to allow it to perform CO measurements on other carrier frequencies. The measurement gaps could be provided in the measurement configuration. Another option is to configure connected mode DRX for the UE, and during the non-active periods, when there are no DL transmissions to the UE, the UE has time to retune the receiver and measure on other carrier frequencies.

Most of the numerous possibilities for configuration of when to report the measurement results and, in particular, the content of the report, which are described above are applicable to the case of CO data collection in RRC_CONNECTED state too.

The CO measurement results could be reported together with the regular RRM measurement reports or using separate reporting. This may be configurable or specified in the 3GPP standard.

Functionality Control from the Core Network and/or the O&M System

The solution has so far been described mainly as if the gNB was in control of the configuration and activation of the feature. However, this could alternatively be the responsibility of the core network or the O&M system or a specialized Spectrum Analytics Function (SAF).

For instance, the Authentication Management Function (AMF) could be in charge and configure the UEs using NAS signaling or using Next Generation Application Protocol (NGAP) signaling to instruct gNB(s) to configure UEs. The UEs would then be configured to report to the AMF via Non-Access Stratum (NAS) signaling or, alternatively, via RRC signaling to the gNB, which would forward the report to the AMF via NGAP signaling.

The O&M system (or another, possibly specialized, controller function) could also be involved, as the controller of the feature and/or as the ultimate receiver of the reported statistics. As one example, the O&M system (or another, possibly specialized, controller function) could be in charge and could then configure UEs via SMS or via communication over the user plane and the UEs could report to the O&M system (or another, possibly specialized, controller function) via the user plane. O&M system (or another, possibly specialized, controller node) could also perform the configuration via network nodes, e.g., instructing AMF(s) or gNB(s) to configure UEs with configuration data provided by the O&M system (or another, possibly specialized, controller function). In such a case, the UEs could also report to the concerned network nodes, e.g., AMF(s) or gNB(s), for further forwarding to (or collection/retrieval by) the O&M system (or another, possibly specialized, controller function).

Even if the O&M system (or another, possibly specialized, controller function) is not in control of the mechanism, it could still be the ultimate (or additional) receiver of the collected statistics. AMF(s) or gNB(s) could forward CO statistics they have acquired in this manner to the O&M system (or another, possibly specialized, controller function) or the O&M system (or another, possibly specialized, controller function) could retrieve the statistics from the AMF(s) or gNB(s) when desired.

Selection of UEs to Configure

The network may not indiscriminately configure UEs for collection and reporting of CO statistics, but may rather use a selective strategy. Some UE properties that could be considered in this process include:

- UE capability/support of performing the desired actions, i.e., UEs to be selected must support the functionality of collecting and reporting CO statistics. There are also "in-between-cases," where a UE support parts of the functionality, e.g., the basic functionality, but not all configuration options. For such in-between cases, the UEs' suitability for selection depends on which parts of the functionality the network wants to configure the UEs with.
- UE mobility. A UE's mobility may be a factor to take into account. For instance, a fast-moving UE, or a UE which from previous statistics or registrations is known to move across large areas, may not be suitable to select, if collection of CO statistics in a limited area is desired. A stationary UE, or a UE with very low mobility, may or may not be suitable. If collection of statistics on a single cell is desired, a stationary UE could be a good choice, at least if it can be complemented by UEs performing measurements in other parts of the cell. UEs with low mobility may be suitable if collection of data is desired in a small area, such as a cell or a group of cells. On the other hand, even if a larger area should be covered, multiple UEs could be configured in different parts of the area, complementing each other's measurement results. In general, it is good to have as many locations in the area as possible covered in order to get a fair picture of the CO situation.
- UEs' energy capabilities or power class. A UE of a type for which energy is an especially scarce resource, such as certain MTC or Internet of Things (IoT) devices, may not be suitable, since collecting and reporting CO statistics would increase the UE's energy consumption.
- UEs' receiver/reception sensitivity capabilities. A UE's receiver/reception capabilities may affect the UE's ability to detect activity on the channel and hence also its CO results, i.e., this may affect whether the UE determines the medium as occupied or clear. A UE with a sensitive receiver may detect enough power/energy to determine that the channel is occupied, while another UE with less sensitive receiver may determine that the channel is clear, even if the measurement is performed at the same time and location. This may be a factor to take into account when selecting UEs to configure and possibly also when processing the reported result.
- UE measurement capability. Some UEs may for instance be able to monitor more beams than others, which can be useful to know when configuring the logging or the measurements for CO statistics purpose.

Usage of Reported CO Data

The network can feed received CO statistics into various Self-Organizing Network (SON) algorithms. A natural suitable choice would be SON algorithms for tuning/adaptation of mechanisms that are used for compensation for potential CCA/LBT failures. This may include e.g., adaptation of measurement time windows, transmission time windows and/or number of additional transmission opportunities, including allocated dedicated transmission resources that are configured/provided to compensate for potential CCA/LBT failures, e.g., for DRS transmissions, system information (SI) transmissions, paging transmissions (with additional PDCCH monitoring occasions per paging occasion), RACH transmissions for random access, PUCCH transmissions for uplink signaling and/or PDCCH transmission for downlink signaling. Compensation procedures also include adapting the configuration of serving cells for a given UE which reported the CO measurement, such as deactivation/deconfiguration of problematic serving cells subject to CCA/LBT failures, change of PSCells through handover procedures, deactivation/deconfiguration of problematic BWPs subject to CCA/LBT failures, etc. CO measurement reports can also be used as basis for adaption of the RRC connection and/or RRC reconnection timers used to control UE RRC connection establishment and re-establishment to the gNB, for example timers T300, T301, T304 or T310.

Another action from the network that the reported CO statistics may trigger could be that the network can change the operating frequency band for a cell if the average CO is high during a long period of CO data collection in the cell or network.

Other long-term adaptations could include one or more of the following:

Enabling or activating additional cells for use, for example to provide additional radio resources to serve users in areas of high CO.

Adapting the mobility parameters, e.g., cell reselection offsets and/or cell reselection priorities for moving traffic load between cells, e.g., from a cell with high CCA failure rate (higher load) to a cell with lower CCA failure rate (lower load).

Adapting antenna patterns (e.g., cell shaping, antenna downtilt) to adapt the coverage of a cell to admit less traffic in a highly loaded cell with high CCA failure rate or to reduce the cell's coverage to cause less interference and CO in neighbor cells.

Adaptation of beam configuration (e.g., increase or reduce the number of SSB/DRS beams in a cell depending on the CO statistics).

Adaptation of transmit powers of cell coverage-defining signals/channels, e.g., SS/PBCH blocks and PRACH to adapt the coverage of a cell to admit less traffic in a highly loaded cell with high CCA failure rate or to reduce the cell's coverage to cause less interference and CO in neighbor cells.

Barring of specific cells or carrier frequencies.

Adapting DRS configuration (e.g., periodicity, bandwidth), SS/PBCH block configuration (e.g., periodicity, number of the blocks per burst—e.g., longer periodicity when the failure rate is below a threshold, more SS/PBCH blocks when the failure rate is above a threshold).

Adapting SMTC window (or DMTC window) configuration (e.g., increase the SMTC window periodicity when the failure rate is above a threshold).

Adapting bandwidth part configuration.

Adaptation of numerology and/or bandwidth of one or more channels or signals or BWPs.

Adaptation of the connected mode DRX configurations given to UEs in a certain cell, area or part of a cell. For instance, if the CO is high, shorter cycles providing more transmission opportunities and thus more chances of CCA success may be configured.

Adaptation of the default paging cycle in one or more cells. For instance, if the CO is high, a shorter default paging cycle may be announced in the system information, providing more frequent paging opportunities and thus more chances for the network to successfully deliver a paging message.

Adaptation of the periodicity/periodicities of one or more SI messages, e.g., using shorter periods (i.e., more frequent transmissions) when the CO is high.

Adaptation of the size of the SI-window, e.g., increasing the size of the SI-window when the CO is high, thereby giving more opportunities to the network to find a transmission opportunity when the channel is clear. (Note that increasing the size of the SI window may require that the SI messages are transmitted with longer periodicity/periodicities in order to avoid overlapping SI-windows.)

Adaptation of the PRACH configuration, e.g., providing denser PRACH opportunities when the CO is high, thereby providing more opportunities for UEs to find a PRACH opportunity when the channel is clear.

Adaptation of the Time-To-Trigger (TTT) setting UEs are configured with for event-triggered measurement reporting. For instance, when the CO is high, the risk is greater that a UE cannot transmit a measurement report immediately when the TTT expires, thus increasing the risk that a handover that the measurement report triggers is initiated too late, causing handover failure or radio link failure. Hence, high CO may be a reason to configure UEs with shorter TTT.

Adaptation of the CCA threshold.

Adaptation of traffic steering between licensed and unlicensed carrier frequencies. For instance, when the CO is high, more UEs can be steered toward licensed carriers and vice versa.

Adaptation of Packet Data Convergence Protocol (PDCP) duplication usage, e.g., increasing the usage when the CO is high.

Adaptation of thresholds (e.g., in terms of Out of Sync (OOS) indications from L1 to higher layers) and/or timers that UEs are configured with for beam failure and/or radio link failure determination.

Another possibility is that if CO statistics per BWP or per sub-band of a BWP is received, the network can select/prioritize BWPs or sub-bands of a BWP with relatively low CO for subsequent UL and DL transmissions. This may be most relevant in the short term when the reported CO data is provided by RRC_CONNECTED UE(s). Then the gNB can select/prioritize the BWP or sub-band of a BWP for UL/DL transmissions from/to a particular UE, based on that particular UE's reported experienced CO. But also reports from UEs in RRC_INACTIVE and/or RRC_IDLE state can be the basis for BWP selection/prioritization or selection/prioritization of a sub-band of a BWP, if the reported CO data is recent or if the reported CO data shows a consistent bias towards one or a set of BWPs or towards one or a set of sub-bands of a BWP (or sub-bands of multiple BWPs).

The network can also further process received CO statistics, e.g., averaging (e.g., exponential averaging) over CO data reported from multiple UEs over a certain time period, or use a leaky bucket type of processing. Other processing possibilities include calculation of correlation of low or high CO to different times of the day, days of the week or month of year and/or calculating correlation of low or high CO to different locations, frequencies, BWPs or sub-bands of BWPs. More advanced processing, such as applying AI and/or machine learning to identify patterns which may be useful for network tuning, UE steering, etc. The processing may be performed in a distributed manner in each gNB or in each AMF, but it could also be performed in a more centralized manner, e.g., by the O&M system or by a centralized RAN node dedicated for processing of various types of measurement data and statistics, such as a Trace Collection Entity. Distributed and centralized processing of the reported CO data may occur in parallel, mainly serving different purposes and resulting in different actions from the network.

If distributed CO data processing in the gNBs is used, a gNB that receives CO data pertaining to cells belonging to other gNBs, the gNB may forward the concerned CO data to the respective appropriate gNB. Such forwarding could be performed over the Xn interface, possibly involving multiple hops over multiple consecutive Xn interfaces. The forwarding could also be performed via the core network, e.g., via one or more AMF(s). Another possibility is that the CO data is forwarded to the O&M system, which in turn distributes it to the concerned gNBs. If forwarding via the RAN is used, but the gNB lacks Xn interface to one of the intended recipient gNBs, then an alternative to multi-hop forwarding through one or more intermediate gNBs can be to let the pending CO data forwarding trigger Xn establishment (Xn Setup) towards the concerned intended recipient gNB. Yet another alternative could be to establish a temporary connection through the transport network to the concerned intended recipient gNB, e.g., using Transmission Control Protocol (TCP), Steam Control Transmission Protocol (SCTP) or User Datagram Protocol (UDP), for transmission of the CO data (e.g., using regular RAN protocols, such as XnAP, or another protocol, such as Hypertext Transfer Protocol (HTTP) or a related protocol). In some embodiments, any other relevant interfaces can be used. For instance, service-based interfaces between the Network Functions (NFs) or point-to-point reference points/interfaces could be used, e.g., Namf for the service based interface of the AMF and Nsmf for the service based interface of the Session Management Function (SMF) etc.

Figure 6:
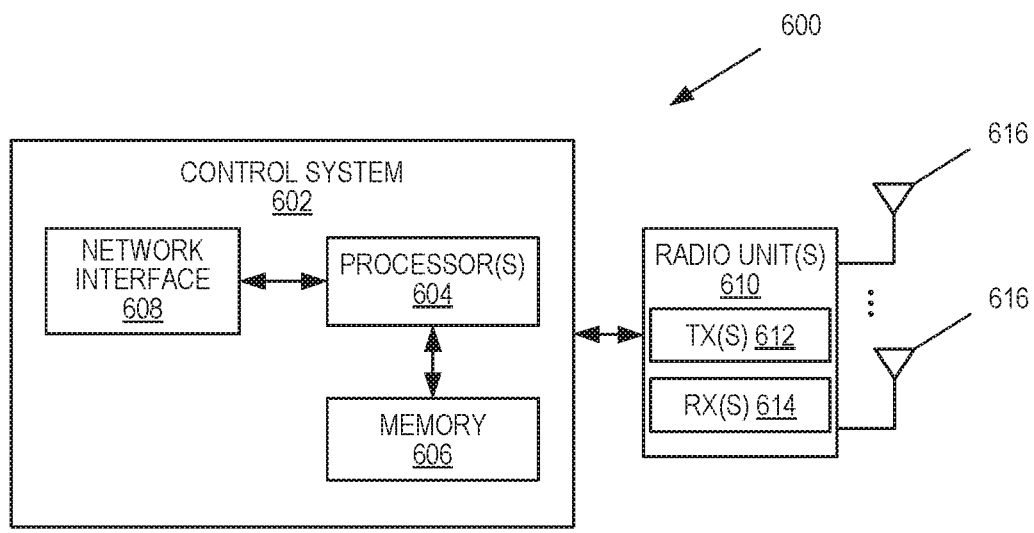
FIG. 6 is a schematic block diagram of a radio access node, according to some embodiments of the present disclosure.

FIG. 6 is a schematic block diagram of a radio access node 600 according to some embodiments of the present disclosure. The radio access node 600 may be, for example, a base station 202 or 206. As illustrated, the radio access node 600 includes a control system 602 that includes one or more processors 604 (e.g., Central Processing Units (CPUs), Application Specific Integrated Circuits (ASICs), Field Programmable Gate Arrays (FPGAs), and/or the like), memory 606, and a network interface 608. The one or more processors 604 are also referred to herein as processing circuitry. In addition, the radio access node 600 includes one or more radio units 610 that each includes one or more transmitters 612 and one or more receivers 614 coupled to one or more antennas 616. The radio units 610 may be referred to or be part of radio interface circuitry. In some embodiments, the radio unit(s) 610 is external to the control system 602 and connected to the control system 602 via, e.g., a wired connection (e.g., an optical cable). However, in some other embodiments, the radio unit(s) 610 and potentially the antenna(s) 616 are integrated together with the control system 602. The one or more processors 604 operate to provide one or more functions of a radio access node 600 as described herein. In some embodiments, the function(s) are implemented in software that is stored, e.g., in the memory 606 and executed by the one or more processors 604.

Figure 7:
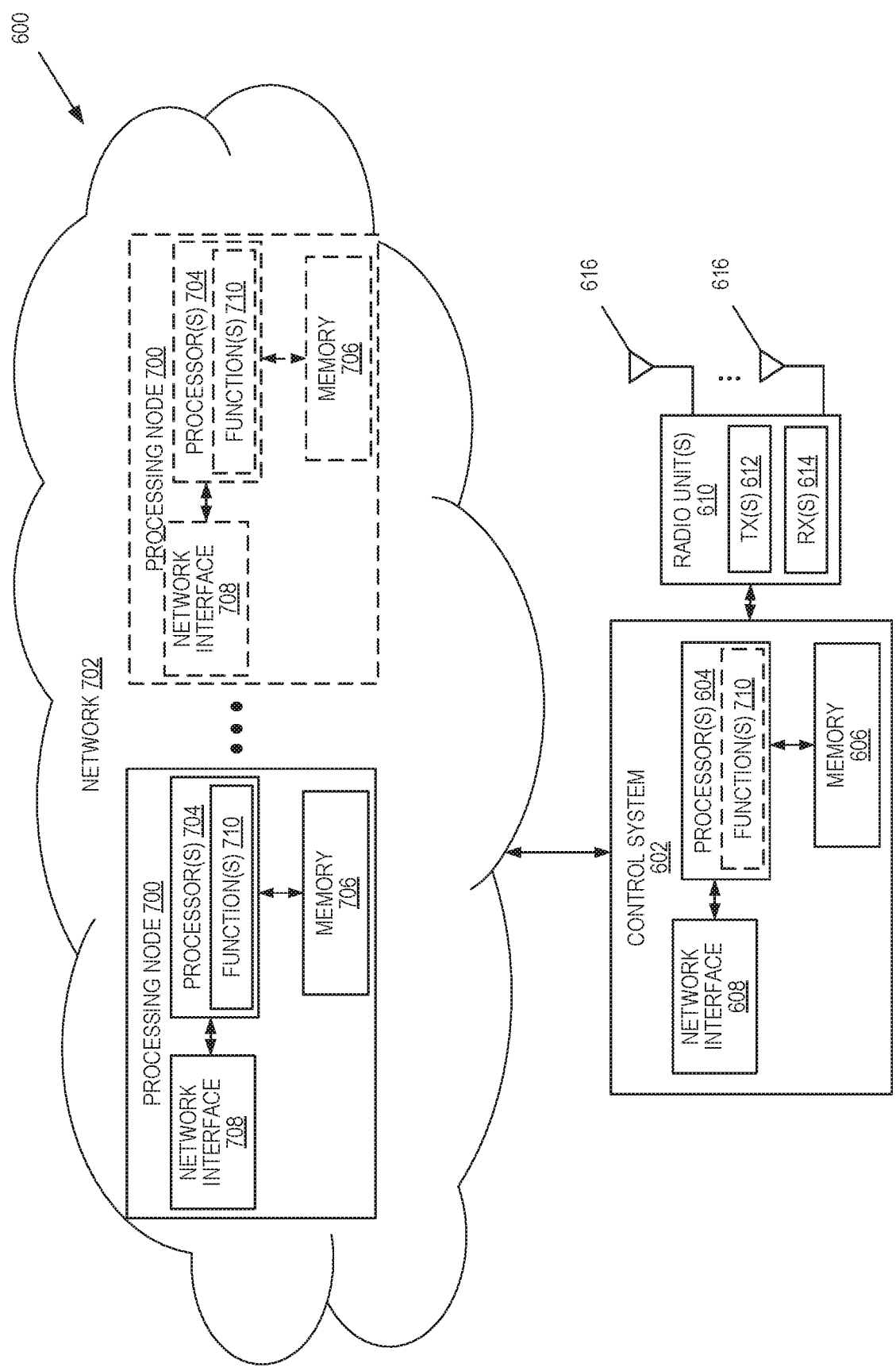
FIG. 7 is a schematic block diagram that illustrates a virtualized embodiment of the radio access node, according to some embodiments of the present disclosure.

FIG. 7 is a schematic block diagram that illustrates a virtualized embodiment of the radio access node 600 according to some embodiments of the present disclosure. This discussion is equally applicable to other types of network nodes. Further, other types of network nodes may have similar virtualized architectures.

As used herein, a "virtualized" radio access node is an implementation of the radio access node 600 in which at least a portion of the functionality of the radio access node 600 is implemented as a virtual component(s) (e.g., via a virtual machine(s) executing on a physical processing node(s) in a network(s)). As illustrated, in this example, the radio access node 600 includes the control system 602 that includes the one or more processors 604 (e.g., CPUs, ASICs, FPGAs, and/or the like), the memory 606, and the network interface 608 and the one or more radio units 610 that each includes the one or more transmitters 612 and the one or more receivers 614 coupled to the one or more antennas 616, as described above. The control system 602 is connected to the radio unit(s) 610 via, for example, an optical cable or the like. The control system 602 is connected to one or more processing nodes 700 coupled to or included as part of a network(s) 702 via the network interface 608. Each processing node 700 includes one or more processors 704 (e.g., CPUs, ASICs, FPGAs, and/or the like), memory 706, and a network interface 708.

In this example, functions 710 of the radio access node 600 described herein are implemented at the one or more processing nodes 700 or distributed across the control system 602 and the one or more processing nodes 700 in any desired manner. In some particular embodiments, some or all of the functions 710 of the radio access node 600 described herein are implemented as virtual components executed by one or more virtual machines implemented in a virtual environment(s) hosted by the processing node(s) 700. As will be appreciated by one of ordinary skill in the art, additional signaling or communication between the processing node(s) 700 and the control system 602 is used in order to carry out at least some of the desired functions 710. Notably, in some embodiments, the control system 602 may not be included, in which case the radio unit(s) 610 communicate directly with the processing node(s) 700 via an appropriate network interface(s).

In some embodiments, a computer program including instructions which, when executed by at least one processor, causes the at least one processor to carry out the functionality of radio access node 600 or a node (e.g., a processing node 700) implementing one or more of the functions 710 of the radio access node 600 in a virtual environment according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 8:
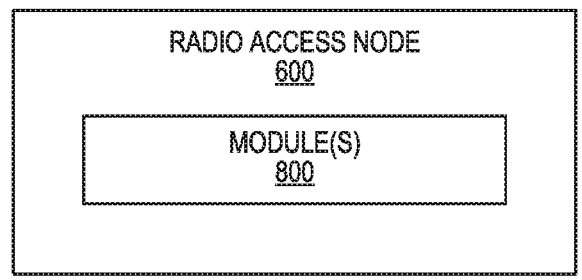
FIG. 8 is a schematic block diagram of the radio access node, according to some other embodiments of the present disclosure.

FIG. 8 is a schematic block diagram of the radio access node 600 according to some other embodiments of the present disclosure. The radio access node 600 includes one or more modules 800, each of which is implemented in software. The module(s) 800 provide the functionality of the radio access node 600 described herein. This discussion is equally applicable to the processing node 700 of FIG. 7 where the modules 800 may be implemented at one of the processing nodes 700 or distributed across multiple processing nodes 700 and/or distributed across the processing node(s) 700 and the control system 602.

Figure 9:
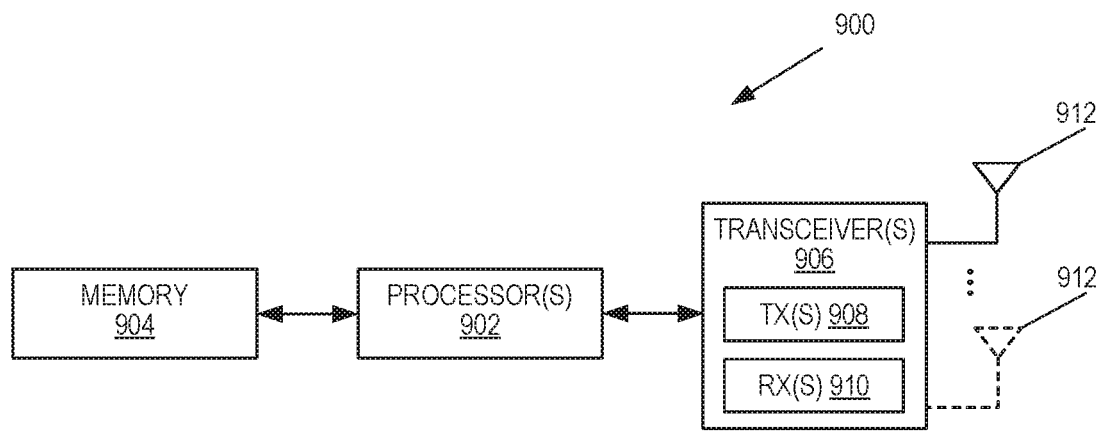
FIG. 9 is a schematic block diagram of a UE, according to some embodiments of the present disclosure.

FIG. 9 is a schematic block diagram of a UE 900 according to some embodiments of the present disclosure. As illustrated, the UE 900 includes one or more processors 902 (e.g., CPUs, ASICs, FPGAs, and/or the like), memory 904, and one or more transceivers 906 each including one or more transmitters 908 and one or more receivers 910 coupled to one or more antennas 912. The transceiver(s) 906 includes radio-front end circuitry connected to the antenna(s) 912 that is configured to condition signals communicated between the antenna(s) 912 and the processor(s) 902, as will be appreciated by on of ordinary skill in the art. The processors 902 are also referred to herein as processing circuitry. The transceivers 906 are also referred to herein as radio circuitry. In some embodiments, the functionality of the UE 900 described above may be fully or partially implemented in software that is, e.g., stored in the memory 904 and executed by the processor(s) 902. Note that the UE 900 may include additional components not illustrated in FIG. 9 such as, e.g., one or more user interface components (e.g., an input/output interface including a display, buttons, a touch screen, a microphone, a speaker(s), and/or the like and/or any other components for allowing input of information into the UE 900 and/or allowing output of information from the UE 900), a power supply (e.g., a battery and associated power circuitry), etc.

In some embodiments, a computer program including instructions which, when executed by at least one processor, causes the at least one processor to carry out the functionality of the UE 900 according to any of the embodiments described herein is provided. In some embodiments, a carrier comprising the aforementioned computer program product is provided. The carrier is one of an electronic signal, an optical signal, a radio signal, or a computer readable storage medium (e.g., a non-transitory computer readable medium such as memory).

Figure 10:
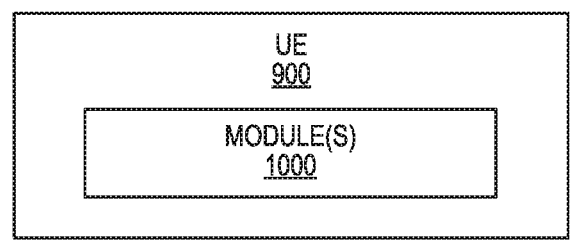
FIG. 10 is a schematic block diagram of the UE, according to some other embodiments of the present disclosure.

FIG. 10 is a schematic block diagram of the UE 900 according to some other embodiments of the present disclosure. The UE 900 includes one or more modules 1000, each of which is implemented in software. The module(s) 1000 provide the functionality of the UE 900 described herein.

Figure 11:
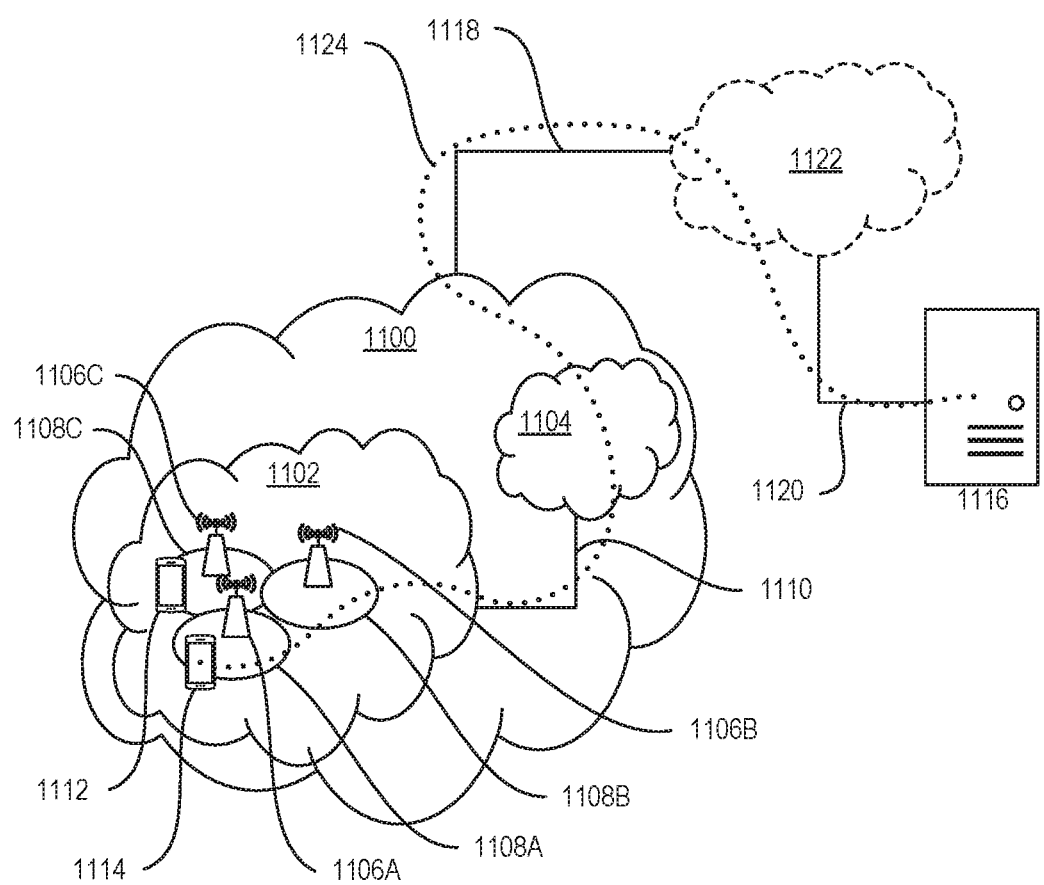
FIG. 11 illustrates a communication system including a telecommunication network, such as a 3GPP-type cellular network, according to some other embodiments of the present disclosure.

With reference to FIG. 11, in accordance with an embodiment, a communication system includes a telecommunication network 1100, such as a 3GPP-type cellular network, which comprises an access network 1102, such as a RAN, and a core network 1104. The access network 1102 comprises a plurality of base stations 1106A, 1106B, 1106C, such as NBs, eNBs, gNBs, or other types of wireless Access Points (APs), each defining a corresponding coverage area 1108A, 1108B, 1108C. Each base station 1106A, 1106B, 1106C is connectable to the core network 1104 over a wired or wireless connection 1110. A first UE 1112 located in coverage area 1108C is configured to wirelessly connect to, or be paged by, the corresponding base station 1106C. A second UE 1114 in coverage area 1108A is wirelessly connectable to the corresponding base station 1106A. While a plurality of UEs 1112, 1114 are illustrated in this example, the disclosed embodiments are equally applicable to a situation where a sole UE is in the coverage area or where a sole UE is connecting to the corresponding base station 1106.

The telecommunication network 1100 is itself connected to a host computer 1116, which may be embodied in the hardware and/or software of a standalone server, a cloud-implemented server, a distributed server, or as processing resources in a server farm. The host computer 1116 may be under the ownership or control of a service provider, or may be operated by the service provider or on behalf of the service provider. Connections 1118 and 1120 between the telecommunication network 1100 and the host computer 1116 may extend directly from the core network 1104 to the host computer 1116 or may go via an optional intermediate network 1122. The intermediate network 1122 may be one of, or a combination of more than one of, a public, private, or hosted network; the intermediate network 1122, if any, may be a backbone network or the Internet; in particular, the intermediate network 1122 may comprise two or more sub-networks (not shown).

The communication system of FIG. 11 as a whole enables connectivity between the connected UEs 1112, 1114 and the host computer 1116. The connectivity may be described as an Over-the-Top (OTT) connection 1124. The host computer 1116 and the connected UEs 1112, 1114 are configured to communicate data and/or signaling via the OTT connection 1124, using the access network 1102, the core network 1104, any intermediate network 1122, and possible further infrastructure (not shown) as intermediaries. The OTT connection 1124 may be transparent in the sense that the participating communication devices through which the OTT connection 1124 passes are unaware of routing of uplink and downlink communications. For example, the base station 1106 may not or need not be informed about the past routing of an incoming downlink communication with data originating from the host computer 1116 to be forwarded (e.g., handed over) to a connected UE 1112. Similarly, the base station 1106 need not be aware of the future routing of an outgoing uplink communication originating from the UE 1112 towards the host computer 1116.

Example implementations, in accordance with an embodiment, of the UE, base station, and host computer discussed in the preceding paragraphs will now be described with reference to FIG. 12. In a communication system 1200, a host computer 1202 comprises hardware 1204 including a communication interface 1206 configured to set up and maintain a wired or wireless connection with an interface of a different communication device of the communication system 1200. The host computer 1202 further comprises processing circuitry 1208, which may have storage and/or processing capabilities. In particular, the processing circuitry 1208 may comprise one or more programmable processors, ASICs, FPGAs, or combinations of these (not shown) adapted to execute instructions. The host computer 1202 further comprises software 1210, which is stored in or accessible by the host computer 1202 and executable by the processing circuitry 1208. The software 1210 includes a host application 1212. The host application 1212 may be operable to provide a service to a remote user, such as a UE 1214 connecting via an OTT connection 1216 terminating at the UE 1214 and the host computer 1202. In providing the service to the remote user, the host application 1212 may provide user data which is transmitted using the OTT connection 1216.

The communication system 1200 further includes a base station 1218 provided in a telecommunication system and comprising hardware 1220 enabling it to communicate with the host computer 1202 and with the UE 1214. The hardware 1220 may include a communication interface 1222 for setting up and maintaining a wired or wireless connection with an interface of a different communication device of the communication system 1200, as well as a radio interface 1224 for setting up and maintaining at least a wireless connection 1226 with the UE 1214 located in a coverage area (not shown in FIG. 12) served by the base station 1218. The communication interface 1222 may be configured to facilitate a connection 1228 to the host computer 1202. The connection 1228 may be direct or it may pass through a core network (not shown in FIG. 12) of the telecommunication system and/or through one or more intermediate networks outside the telecommunication system. In the embodiment shown, the hardware 1220 of the base station 1218 further includes processing circuitry 1230, which may comprise one or more programmable processors, ASICs, FPGAs, or combinations of these (not shown) adapted to execute instructions. The base station 1218 further has software 1232 stored internally or accessible via an external connection.

The communication system 1200 further includes the UE 1214 already referred to. The UE's 1214 hardware 1234 may include a radio interface 1236 configured to set up and maintain a wireless connection 1226 with a base station serving a coverage area in which the UE 1214 is currently located. The hardware 1234 of the UE 1214 further includes processing circuitry 1238, which may comprise one or more programmable processors, ASICs, FPGAs, or combinations of these (not shown) adapted to execute instructions. The UE 1214 further comprises software 1240, which is stored in or accessible by the UE 1214 and executable by the processing circuitry 1238. The software 1240 includes a client application 1242. The client application 1242 may be operable to provide a service to a human or non-human user via the UE 1214, with the support of the host computer 1202. In the host computer 1202, the executing host application 1212 may communicate with the executing client application 1242 via the OTT connection 1216 terminating at the UE 1214 and the host computer 1202. In providing the service to the user, the client application 1242 may receive request data from the host application 1212 and provide user data in response to the request data. The OTT connection 1216 may transfer both the request data and the user data. The client application 1242 may interact with the user to generate the user data that it provides.

Figure 12:
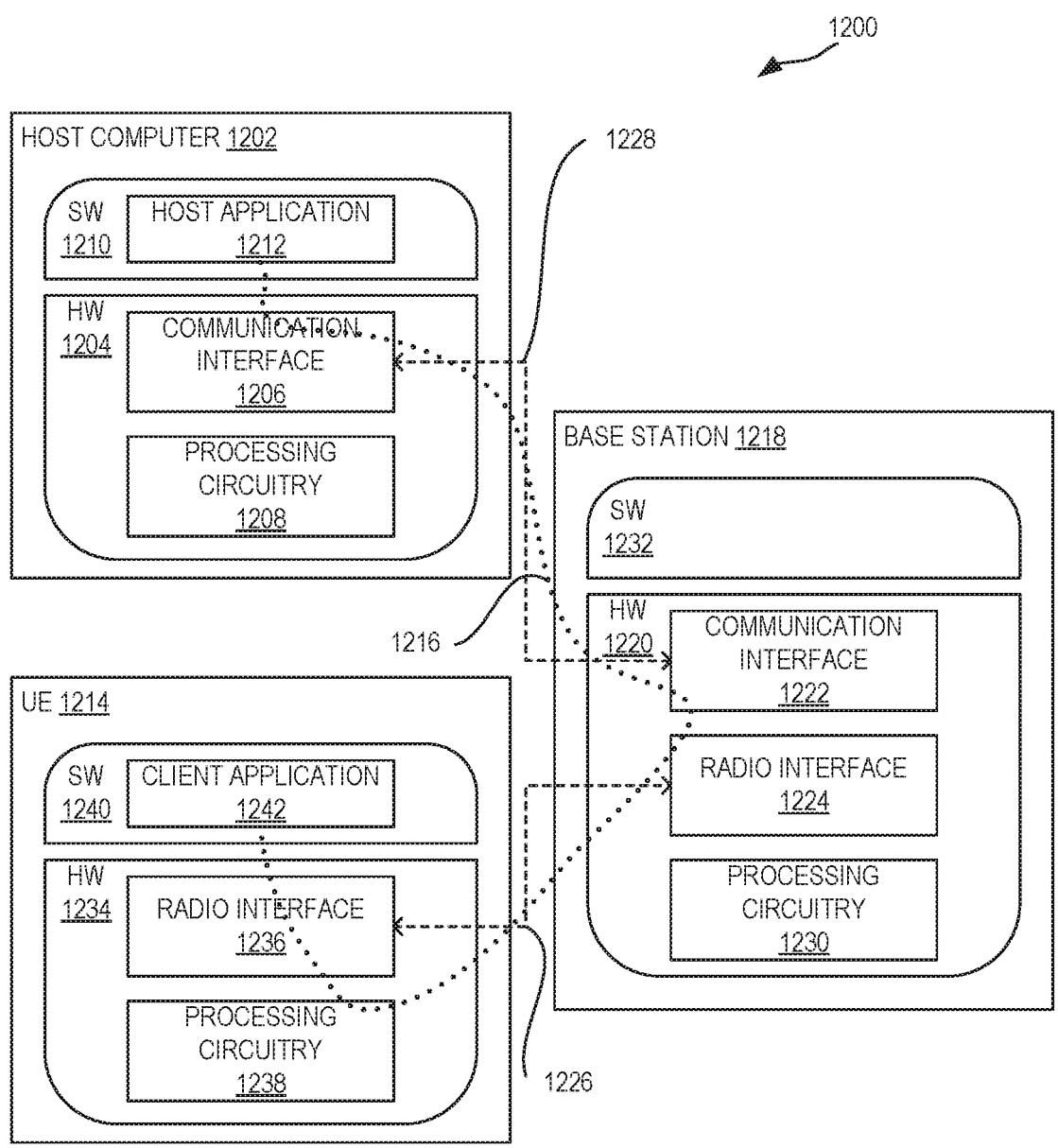

It is noted that the host computer 1202, the base station 1218, and the UE 1214 illustrated in FIG. 12 may be similar or identical to the host computer 1116, one of the base stations 1106A, 1106B, 1106C, and one of the UEs 1112, 1114 of FIG. 11, respectively. This is to say, the inner workings of these entities may be as shown in FIG. 12 and independently, the surrounding network topology may be that of Figure In FIG. 12, the OTT connection 1216 has been drawn abstractly to illustrate the communication between the host computer 1202 and the UE 1214 via the base station 1218 without explicit reference to any intermediary devices and the precise routing of messages via these devices. The network infrastructure may determine the routing, which may be configured to hide from the UE 1214 or from the service provider operating the host computer 1202, or both. While the OTT connection 1216 is active, the network infrastructure may further take decisions by which it dynamically changes the routing (e.g., on the basis of load balancing consideration or reconfiguration of the network).

The wireless connection 1226 between the UE 1214 and the base station 1218 is in accordance with the teachings of the embodiments described throughout this disclosure. One or more of the various embodiments improve the performance of OTT services provided to the UE 1214 using the OTT connection 1216, in which the wireless connection 1226 forms the last segment. More precisely, the teachings of these embodiments may improve the number of CCA/LBT failures and thereby provide benefits such as better responsiveness and higher speeds.

A measurement procedure may be provided for the purpose of monitoring data rate, latency, and other factors on which the one or more embodiments improve. There may further be an optional network functionality for reconfiguring the OTT connection 1216 between the host computer 1202 and the UE 1214, in response to variations in the measurement results. The measurement procedure and/or the network functionality for reconfiguring the OTT connection 1216 may be implemented in the software 1210 and the hardware 1204 of the host computer 1202 or in the software 1240 and the hardware 1234 of the UE 1214, or both. In some embodiments, sensors (not shown) may be deployed in or in association with communication devices through which the OTT connection 1216 passes; the sensors may participate in the measurement procedure by supplying values of the monitored quantities exemplified above, or supplying values of other physical quantities from which the software 1210, 1240 may compute or estimate the monitored quantities. The reconfiguring of the OTT connection 1216 may include message format, retransmission settings, preferred routing, etc.; the reconfiguring need not affect the base station 1218, and it may be unknown or imperceptible to the base station 1218. Such procedures and functionalities may be known and practiced in the art. In certain embodiments, measurements may involve proprietary UE signaling facilitating the host computer 1202's measurements of throughput, propagation times, latency, and the like. The measurements may be implemented in that the software 1210 and 1240 causes messages to be transmitted, in particular empty or 'dummy' messages, using the OTT connection 1216 while it monitors propagation times, errors, etc.

FIG. 13 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 13 will be included in this section. In step 1300, the host computer provides user data. In sub-step 1302 (which may be optional) of step 1300, the host computer provides the user data by executing a host application. In step 1304, the host computer initiates a transmission carrying the user data to the UE. In step 1306 (which may be optional), the base station transmits to the UE the user data which was carried in the transmission that the host computer initiated, in accordance with the teachings of the embodiments described throughout this disclosure. In step 1308 (which may also be optional), the UE executes a client application associated with the host application executed by the host computer.

FIG. 14 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 14 will be included in this section. In step 1400 of the method, the host computer provides user data. In an optional sub-step (not shown) the host computer provides the user data by executing a host application. In step 1402, the host computer initiates a transmission carrying the user data to the UE. The transmission may pass via the base station, in accordance with the teachings of the embodiments described throughout this disclosure. In step 1404 (which may be optional), the UE receives the user data carried in the transmission.

Figures 15, 16:
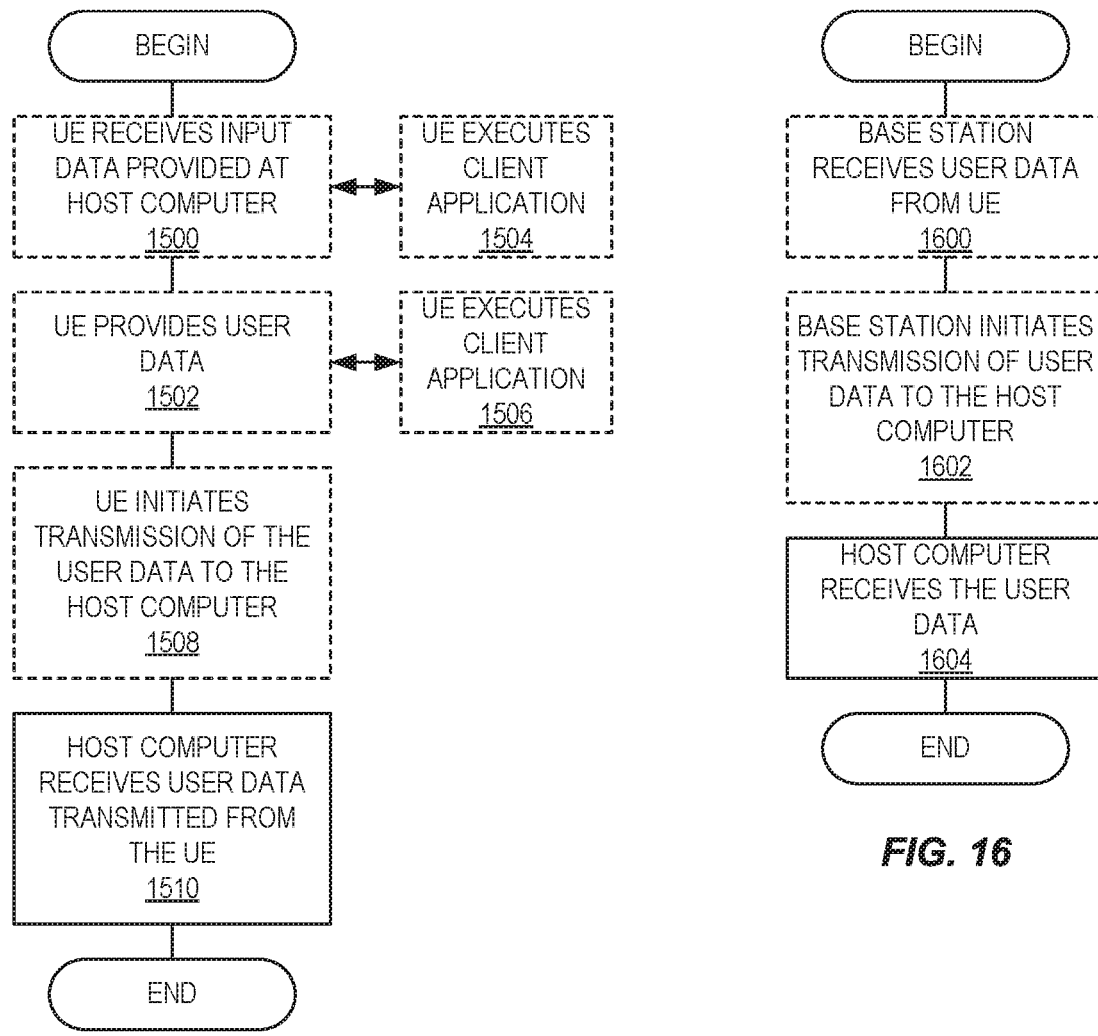

FIG. 15 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 15 will be included in this section. In step 1500 (which may be optional), the UE receives input data provided by the host computer. Additionally or alternatively, in step 1502, the UE provides user data. In sub-step 1504 (which may be optional) of step 1500, the UE provides the user data by executing a client application. In sub-step 1506 (which may be optional) of step 1502, the UE executes a client application which provides the user data in reaction to the received input data provided by the host computer. In providing the user data, the executed client application may further consider user input received from the user. Regardless of the specific manner in which the user data was provided, the UE initiates, in sub-step 1508 (which may be optional), transmission of the user data to the host computer. In step 1510 of the method, the host computer receives the user data transmitted from the UE, in accordance with the teachings of the embodiments described throughout this disclosure.

FIG. 16 is a flowchart illustrating a method implemented in a communication system, in accordance with one embodiment. The communication system includes a host computer, a base station, and a UE which may be those described with reference to FIGS. 11 and 12. For simplicity of the present disclosure, only drawing references to FIG. 16 will be included in this section. In step 1600 (which may be optional), in accordance with the teachings of the embodiments described throughout this disclosure, the base station receives user data from the UE. In step 1602 (which may be optional), the base station initiates transmission of the received user data to the host computer. In step 1604 (which may be optional), the host computer receives the user data carried in the transmission initiated by the base station.

Any appropriate steps, methods, features, functions, or benefits disclosed herein may be performed through one or more functional units or modules of one or more virtual apparatuses. Each virtual apparatus may comprise a number of these functional units. These functional units may be implemented via processing circuitry, which may include one or more microprocessor or microcontrollers, as well as other digital hardware, which may include Digital Signal Processor (DSPs), special-purpose digital logic, and the like. The processing circuitry may be configured to execute program code stored in memory, which may include one or several types of memory such as Read Only Memory (ROM), Random Access Memory (RAM), cache memory, flash memory devices, optical storage devices, etc. Program code stored in memory includes program instructions for executing one or more telecommunications and/or data communications protocols as well as instructions for carrying out one or more of the techniques described herein. In some implementations, the processing circuitry may be used to cause the respective functional unit to perform corresponding functions according one or more embodiments of the present disclosure.

While processes in the figures may show a particular order of operations performed by certain embodiments of the present disclosure, it should be understood that such order is exemplary (e.g., alternative embodiments may perform the operations in a different order, combine certain operations, overlap certain operations, etc.).

EMBODIMENTS

Group A Embodiments

Embodiment 1. A method performed by a wireless device for tuning one or more parameters of a network, the method comprising: obtaining a plurality of Channel Occupancy (CO) measurements; and reporting a result of one or more of the plurality of CO measurements to a network node.

Embodiment 2. The method of the previous embodiment wherein one or more of the plurality of CO measurements are obtained when a radio resource control (RRC) state of the wireless device is one of RRC_INACTIVE and RRC_IDLE.

Embodiment 3. The method of any of the previous embodiments wherein one or more of the plurality of CO measurements are obtained when an RRC state of the wireless device is RRC_CONNECTED.

Embodiment 4. The method of any of the previous embodiments further comprising adjusting one or more operational parameters of the wireless device based on the plurality of CO measurements.

Embodiment 5. The method of the previous embodiment wherein the one or more operational parameters comprise one or more of: selection of bandwidth part(s) or sub-band(s) of bandwidth part(s) for subsequent uplink and/or downlink transmissions; and prioritization of bandwidth part(s) or sub-band(s) of bandwidth part(s) for subsequent uplink and/or downlink transmissions.

Embodiment 6. The method of any of the previous embodiments wherein reporting the result of the one or more of the plurality of CO measurements to the network node comprises transmitting the result to the network node.

Embodiment 7. The method of any of the previous embodiments further comprising: obtaining a configuration for CO measurement and reporting, wherein obtaining the plurality of CO measurements and reporting the result of the one or more of the plurality of CO measurements to the network are in response to obtaining the configuration for CO measurement and reporting.

Embodiment 8. The method of the previous embodiment wherein the configuration for CO measurement and reporting is obtained via one or more of: a system information (SI) broadcast; dedicated radio resource control (RRC) signaling; non-access stratum (NAS) signaling; short message service (SMS) signaling; and communication over a user plane.

Embodiment 9. The method of the previous 2 embodiments wherein the configuration for CO measurement and reporting specifies one or more configuration parameters comprising: a duration over which the plurality of CO measurements should be taken; one or more time restrictions regarding when the plurality of CO measurements should be taken; a periodicity of when the plurality of CO measurements should be taken; one or more areas in which the plurality of CO measurements should be taken; one or more networks in which the plurality of CO measurements should be taken; one or more carrier frequencies, bands, and/or bandwidth parts in which the plurality of CO measurements should be taken; a bandwidth of channel monitoring used for the plurality of CO measurements; a duration over which each one of the plurality of CO measurement should be taken; a period over which the plurality of CO measurements should be taken before the report is provided to the network; one or more CO measurement types to be used for the plurality of CO measurements; one or more parameters about the plurality of CO measurements to be included in the report; and one or more rules and/or conditions for when the report should be sent to the network.

Embodiment 10. The method of the previous embodiment wherein the one or more configuration parameters are different for one or more of: different bandwidth parts or sub-bands of bandwidth parts; different carrier frequencies; and different networks (e.g., different public land mobile networks and different neutral host networks).

Embodiment 11. The method of any of the previous 4 embodiments wherein the configuration for CO measurement and reporting indicates one or more times at which a nearby base station will not be transmitting, and the wireless device is configured to obtain the plurality of CO measurements when the nearby base station is not transmitting.

Embodiment 12. The method of any of the previous embodiments wherein each one of the plurality of CO measurements are obtained in conjunction with a page monitoring function of the wireless device.

Embodiment 13. The method of the previous embodiment wherein each one of the plurality of CO measurements are obtained in conjunction with a serving cell quality measurement.

Embodiment 14. The method of any of the previous embodiments wherein: the wireless device is configured to communicate with a base station via wireless signals provided at a first frequency; and one or more of the plurality of CO measurements occur at a second frequency that is different than the first frequency.

Embodiment 15. The method of the previous embodiment wherein the wireless device is configured to obtain the plurality of CO measurements only if the wireless device reselects to the second frequency.

Embodiment 16. The method of the previous 2 embodiments wherein the wireless device is configured to switch a receiver from the first frequency to the second frequency to perform each one of the plurality of CO measurements.

Embodiment 17. The method of any of the previous embodiments wherein obtaining each one of the plurality of CO measurements comprises one or more of: measuring the energy within a channel frequency for a channel monitoring period and comparing the measured energy to an energy detection threshold; measuring a received signal strength indication (RSSI) within the channel frequency for the channel monitoring period and comparing the measured RSSI to a threshold; determining if a preamble has been detected during the channel monitoring period; and determining an interference level within the channel frequency for the channel monitoring period.

Embodiment 18. The method of any of the previous embodiments wherein the network operates at least partially in an unlicensed spectrum.

Embodiment 19. The method of any of the previous embodiments wherein the network operates at least partially in a listen before talk (LBT) mode of operation.

Embodiment 20. The method of any of the previous embodiments, further comprising: providing user data; and forwarding the user data to a host computer via the transmission to the base station.

Group B Embodiments

Embodiment 21. A method performed by a network node for tuning one or more parameters of a network, the method comprising: adjusting one or more network parameters based on channel occupancy (CO) data from a plurality of wireless devices.

Embodiment 22. The method of the previous embodiment wherein the network node is a base station.

Embodiment 23. The method of the previous embodiment further comprising receiving CO data from at least one of the plurality of wireless devices via wireless communication signals between the base station and the at least one of the plurality of wireless devices.

Embodiment 24. The method of the previous embodiment further comprising forwarding the CO data from the at least one of the plurality of wireless devices to an additional network node.

Embodiment 25. The method of the previous embodiment wherein adjusting the one or more network parameters comprises: receiving one or more network adjustment parameters from the additional network node, wherein the one or more network adjustment parameters are based on the CO data from the plurality of wireless devices; and adjusting one or more operational parameters of the base station based on the one or more network adjustment parameters.

Embodiment 26. The method of any of the previous embodiments wherein the additional network node is a core network node.

Embodiment 27. The method of the first embodiment of Group B wherein the network node is a core network node.

Embodiment 28. The method of the previous embodiment further comprising determining the one or more network parameters to adjust based on the CO data from the plurality of wireless devices.

Embodiment 29. The method of the previous embodiment wherein determining the one or more network parameters to adjust based on the CO data from the plurality of wireless devices comprises analyzing the CO data from the plurality of wireless devices.

Embodiment 30. The method of the previous embodiment wherein analyzing the CO data from the plurality of wireless devices comprises determining one or more patterns associated with the CO data from the plurality of wireless devices.

Embodiment 31. The method of the previous embodiment wherein analyzing the CO data from the plurality of wireless devices comprises providing the CO data from the plurality of wireless devices to a machine learning system.

Embodiment 32. The method of any of the previous embodiments further comprising configuring the plurality of wireless devices to measure CO and provide CO data to the network based on CO measurements.

Embodiment 33. The method of the previous embodiment wherein configuring the plurality of wireless devices comprises providing one or more configuration parameters to the plurality of UEs, the one or more configuration parameters comprising: a duration over which the plurality of CO measurements should be taken; one or more time restrictions regarding when the plurality of CO measurements should be taken; a periodicity of when the plurality of CO measurements should be taken; one or more areas in which the plurality of CO measurements should be taken; one or more networks in which the plurality of CO measurements should be taken; one or more carrier frequencies, bands, and/or bandwidth parts in which the plurality of CO measurements should be taken; a bandwidth of channel monitoring used for the plurality of CO measurements; a duration over which each one of the plurality of CO measurement should be taken; a period over which the plurality of CO measurements should be taken before the report is provided to the network; one or more CO measurement types to be used for the plurality of CO measurements; one or more parameters about the plurality of CO measurements to be included in the report; and one or more rules and/or conditions for when the report should be sent to the network.

Embodiment 34. The method of the previous embodiment wherein the one or more configuration parameters are different for one or more of: different bandwidth parts or sub-bands of bandwidth parts; different carrier frequencies; and different networks (e.g., different public land mobile networks and different neutral host networks).

Embodiment 35. The method of any of the previous 2 embodiments wherein the one or more configuration parameters are different for at least two of the plurality of wireless devices.

Embodiment 36. The method of any of the previous 4 embodiments further comprising determining to configure the plurality of wireless devices from a larger group of wireless devices.

Embodiment 37. The method of the previous embodiment wherein determining to configure a wireless device is based on one or more of: a capability of the wireless device to obtain CO measurements; a mobility of the wireless device; one or more energy capabilities of the wireless device; a power class of the wireless device; a receiver sensitivity of the wireless device; and a measurement capability of the wireless device.

Embodiment 38. The method of any of the previous embodiments wherein the one or more network parameters comprise: adaptation of CO measurement time windows; transmission time windows;—number of additional transmission opportunities; allocated dedicated transmission resources that are configured to compensate for potential clear channel assessment (CCA) and/or listen-before-talk (LBT) failures, wherein the dedicated transmission resources are for one or more of: downlink reference signal (DRS) transmissions; system information (SI) transmissions; paging transmissions; and physical downlink control channel (PDCCH) transmissions; configuration of service cells; configuration of service cells for a wireless device in the plurality of wireless devices that provided CO data to the network node; adaptation of radio resource control (RRC) connections; adaptation of RRC connection timers; enablement of additional service cells; adaptation of mobility parameters; adaptation of antenna patterns; adaptation of beam configuration; adaptation of transmit powers; barring of service cells; barring of carrier frequencies; adaptation of DRS configuration; adaptation of synchronization signal/physical broadcast channel (SS/PBCH) block configuration; adaptation of SS/PBCH block measurement timing configuration (SMTC); adaptation of discovery measurement timing configuration (DMTC); adaptation of connection mode configurations given to wireless devices in one of a certain cell, a certain area, or a part of a cell; adaptation of a default paging cycle in one or more cells; adaptation of a periodicity of one or more SI messages; adaptation of an SI window size; adaptation of a physical random access channel (PRACH) configuration; adaptation of a time-to-trigger (TTT) setting for one or more wireless devices; adaptation of a CCA threshold; adaptation of traffic steering between carrier frequencies; adaptation of packet data convergence protocol (PDCP) duplication usage; adaptation of thresholds and/or timers used by wireless devices for beam failure and/or radio link failure determination; and selection of bandwidth parts (BWPs) or sub-bands of a BWP for uplink and/or downlink transmissions.

Embodiment 39. The method of any of the previous embodiments wherein the CO data from the plurality of wireless devices is based at least in part on CO measurements taken when the plurality of wireless devices are in a radio resource control (RRC) state that is one of RRC_INACTIVE and RRC_IDLE.

Embodiment 40. The method of any of the previous embodiments wherein the CO data from the plurality of wireless devices is based at least in part on CO measurements taken when the plurality of devices are in an RRC state that is RRC_CONNECTED.

Embodiment 41. The method of any of the previous embodiments, further comprising: obtaining user data; and forwarding the user data to a host computer or a wireless device.

Group C Embodiments

Embodiment 42. A wireless device for tuning one or more parameters of a network, the wireless device comprising: processing circuitry configured to perform any of the steps of any of the Group A embodiments; and power supply circuitry configured to supply power to the wireless device.

Embodiment 43. A network node for tuning one or more parameters of a network, the network node comprising: processing circuitry configured to perform any of the steps of any of the Group B embodiments; and power supply circuitry configured to supply power to the network node.

Embodiment 44. A User Equipment, UE, for tuning one or more parameters of a network, the UE comprising: an antenna configured to send and receive wireless signals; radio front-end circuitry connected to the antenna and to processing circuitry, and configured to condition signals communicated between the antenna and the processing circuitry; the processing circuitry being configured to perform any of the steps of any of the Group A embodiments; an input interface connected to the processing circuitry and configured to allow input of information into the UE to be processed by the processing circuitry; an output interface connected to the processing circuitry and configured to output information from the UE that has been processed by the processing circuitry; and a battery connected to the processing circuitry and configured to supply power to the UE.

Embodiment 45. A communication system including a host computer comprising: processing circuitry configured to provide user data; and a communication interface configured to forward the user data to a cellular network for transmission to a User Equipment, UE; wherein the cellular network comprises a network node having a radio interface and processing circuitry, the network node's processing circuitry configured to perform any of the steps of any of the Group B embodiments.

Embodiment 46. The communication system of the previous embodiment further including the network node.

Embodiment 47. The communication system of the previous 2 embodiments, further including the UE, wherein the UE is configured to communicate with the network node.

Embodiment 48. The communication system of the previous 3 embodiments, wherein: the processing circuitry of the host computer is configured to execute a host application, thereby providing the user data; and the UE comprises processing circuitry configured to execute a client application associated with the host application.

Embodiment 49. A method implemented in a communication system including a host computer, a network node, and a User Equipment, UE, the method comprising: at the host computer, providing user data; and at the host computer, initiating a transmission carrying the user data to the UE via a cellular network comprising the network node, wherein the network node performs any of the steps of any of the Group B embodiments.

Embodiment 50. The method of the previous embodiment, further comprising, at the network node, transmitting the user data.

Embodiment 51. The method of the previous 2 embodiments, wherein the user data is provided at the host computer by executing a host application, the method further comprising, at the UE, executing a client application associated with the host application.

Embodiment 52. A User Equipment, UE, configured to communicate with a network node, the UE comprising a radio interface and processing circuitry configured to perform the method of the previous 3 embodiments.

Embodiment 53. A communication system including a host computer comprising: processing circuitry configured to provide user data; and a communication interface configured to forward user data to a cellular network for transmission to a User Equipment, UE; wherein the UE comprises a radio interface and processing circuitry, the UE's components configured to perform any of the steps of any of the Group A embodiments.

Embodiment 54. The communication system of the previous embodiment, wherein the cellular network further includes a network node configured to communicate with the UE.

Embodiment 55. The communication system of the previous 2 embodiments, wherein: the processing circuitry of the host computer is configured to execute a host application, thereby providing the user data; and the UE's processing circuitry is configured to execute a client application associated with the host application.

Embodiment 56. A method implemented in a communication system including a host computer, a network node, and a User Equipment, UE, the method comprising: at the host computer, providing user data; and at the host computer, initiating a transmission carrying the user data to the UE via a cellular network comprising the network node, wherein the UE performs any of the steps of any of the Group A embodiments.

Embodiment 57. The method of the previous embodiment, further comprising at the UE, receiving the user data from the network node.

Embodiment 58. A communication system including a host computer comprising: communication interface configured to receive user data originating from a transmission from a User Equipment, UE, to a base station; wherein the UE comprises a radio interface and processing circuitry, the UE's processing circuitry configured to perform any of the steps of any of the Group A embodiments.

Embodiment 59. The communication system of the previous embodiment, further including the UE.

Embodiment 60. The communication system of the previous 2 embodiments, further including the base station, wherein the base station comprises a radio interface configured to communicate with the UE and a communication interface configured to forward to the host computer the user data carried by a transmission from the UE to the base station.

Embodiment 61. The communication system of the previous 3 embodiments, wherein: the processing circuitry of the host computer is configured to execute a host application; and the UE's processing circuitry is configured to execute a client application associated with the host application, thereby providing the user data.

Embodiment 62. The communication system of the previous 4 embodiments, wherein: the processing circuitry of the host computer is configured to execute a host application, thereby providing request data; and the UE's processing circuitry is configured to execute a client application associated with the host application, thereby providing the user data in response to the request data.

Embodiment 63. A method implemented in a communication system including a host computer, a base station, and a User Equipment, UE, the method comprising: at the host computer, receiving user data transmitted to the base station from the UE, wherein the UE performs any of the steps of any of the Group A embodiments.

Embodiment 64. The method of the previous embodiment, further comprising, at the UE, providing the user data to the base station.

Embodiment 65. The method of the previous 2 embodiments, further comprising: at the UE, executing a client application, thereby providing the user data to be transmitted; and at the host computer, executing a host application associated with the client application.

Embodiment 66. The method of the previous 3 embodiments, further comprising: at the UE, executing a client application; and at the UE, receiving input data to the client application, the input data being provided at the host computer by executing a host application associated with the client application; wherein the user data to be transmitted is provided by the client application in response to the input data.

Embodiment 67. A communication system including a host computer comprising a communication interface configured to receive user data originating from a transmission from a User Equipment, UE, to a network node, wherein the network node comprises a radio interface and processing circuitry, the network node's processing circuitry configured to perform any of the steps of any of the Group B embodiments.

Embodiment 68. The communication system of the previous embodiment further including the network node.

Embodiment 69. The communication system of the previous 2 embodiments, further including the UE, wherein the UE is configured to communicate with the network node.

Embodiment 70. The communication system of the previous 3 embodiments, wherein: the processing circuitry of the host computer is configured to execute a host application; and the UE is configured to execute a client application associated with the host application, thereby providing the user data to be received by the host computer.

Embodiment 71. A method implemented in a communication system including a host computer, a base station, and a User Equipment, UE, the method comprising: at the host computer, receiving, from the base station, user data originating from a transmission which the base station has received from the UE, wherein the UE performs any of the steps of any of the Group A embodiments.

Embodiment 72. The method of the previous embodiment, further comprising at the base station, receiving the user data from the UE.

Embodiment 73. The method of the previous 2 embodiments, further comprising at the base station, initiating a transmission of the received user data to the host computer.

At least some of the following abbreviations may be used in this disclosure. If there is an inconsistency between abbreviations, preference should be given to how it is used above. If listed multiple times below, the first listing should be preferred over any subsequent listing(s).

3GPP 3rd Generation Partnership Project
5G 5th Generation
ACK Acknowledgment
AI Artificial Intelligence
AMF Access and Mobility management Function
AP Access Point
ASIC Application Specific Integrated Circuit
BWP Bandwidth Part
CAPC Channel Access Priority Class
CCA Clear Channel Assessment
CO Channel Occupancy
COT Channel Occupancy Time
CPU Central Processing Unit
CSI-RS Channel State Information Reference Signal
CWS Contention Window Size
DL Downlink
DMTC DRS Measurement Timing Configuration
DRS Discovery Reference Signal
DRX Discontinuous Reception
ED Energy Detection
EDGE Enhanced Data rates for GSM Evolution
eLAA Enhanced License Assisted Access
eNB Evolved NodeB (LTE base station)
ETSI European Telecommunications Standards Institute
ETSI HS ETSI Harmonized Standard
feLAA Further Enhanced License Assisted Access
FPGA Field Programmable Gate Array
gNB NR radio base station
GPRS General Packet Radio Service
GPS Global Positioning System
GSM Global System for Mobile communication
HTTP Hyper Text Transfer Protocol
ID Identity/Identifier
IDC In-Device Coexistence
IE Information Element IEEE Institute of Electrical and Electronics Engineers
IM Interference Measurement
IoT Internet of Things
L1 Layer 1
LAA License Assisted Access
LBT Listen-Before-Talk
LTE Long Term Evolution
MAC Medium Access Control
MCOT Maximum Channel Occupancy Time
MDT Minimization of Drive Tests
MME Mobility Management Entity
MTC Machine Type Communication
NAS Non-Access Stratum
NF Network Function
NGAP NG Application Protocol
NGC Next Generation Core Network
NHN Neutral Host Network
NR NR (5G radio access technology specified by 3GPP.)
NR-U NR Unlicensed (NR operation in unlicensed spectrum)
O&M Operation and Maintenance
OOS Out Of Sync
OTT Over the Top
PBCH Physical Broadcast Channel
PCI Physical Cell Identity
PDCCH Physical Downlink Control Channel
PDCP Packet Data Convergence Protocol
PDU Protocol Data Unit
P-GW Packet Data Network Gateway
PLMN Public Land Mobile Network
PRACH Physical Random Access Channel
PSCell Primary Secondary Cell
PUCCH Physical Uplink Control Channel
PUSCH Physical Uplink Shared Channel
QCI QoS Class Indicator
QoS Quality of Service
RACH Random Access Channel
RAM Random Access Memory
RAN Radio Access Network
RAT Radio Access Technology
RMTC RSSI Measurement Timing Configuration
ROM Read Only Memory
RRC Radio Resource Control
RRH Remote Radio Head
RRM Radio Resource Management
RS Reference Signal
RSRP Reference Signal Received Power
RSRQ Reference Signal Received Quality
RSSI Received Signal Strength Indicator
SAF Spectrum Analytics Function
SCEF Service Capability Exposure Function
SCTP Stream Control Transmission Protocol
SDU Service Data Unit
SFN System Frame Number
SI System Information
SINR Signal to Interference and Noise Ratio
SMF Session Management Function
SMS Short Message Service
SMTC SSB Measurement Timing Configuration
SON Self-Organizing Network
SS Synchronization Signal
SSB Synchronization Signal Block
TCP Transmission Control Protocol
TMSI Temporary Mobile Subscriber Identity
TS Technical Specification
TTT Time-To-Trigger
UCI Uplink Control Information
UDP User Datagram Protocol
UE User equipment
UL Uplink
WCDMA Wideband Code Division Multiple Access
Xn The interface/reference point between two gNBs.
XnAP Xn Application Protocol Those skilled in the art will recognize improvements and modifications to the embodiments of the present disclosure. All such improvements and modifications are considered within the scope of the concepts disclosed herein.

What is claimed is:

1. A method performed by a wireless device for tuning one or more parameters of a network, the method comprising:
obtaining a configuration for Channel Occupancy, CO, measurement and reporting;
obtaining a plurality of CO measurements based on the obtained configuration for the CO measurement and reporting, where:
one or more of the plurality of CO measurements are obtained when a Radio Resource Control, RRC, state of the wireless device is one of the group consisting of: RRC_INACTIVE; and RRC_IDLE; and
one or more of the plurality of CO measurements are obtained when the RRC state of the wireless device is RRC_CONNECTED; and
reporting a result of the one or more of the plurality of CO measurements to a network node, where the result comprises a single report that includes one or more CO measurements obtained from each of:
the group consisting of: RRC_INACTIVE; and RRC_IDLE; and RRC_CONNECTED.

2. The method of claim 1 further comprising:
adjusting one or more operational parameters of the wireless device based on the plurality of CO measurements.

3. The method of claim 2 wherein the one or more operational parameters comprise one or more of the group consisting of:
selection of one or more bandwidth parts or sub-bands of bandwidth parts for subsequent uplink and/or downlink transmissions; and
prioritization of the one or more bandwidth parts or sub-bands of bandwidth parts for subsequent uplink and/or downlink transmissions.

4. The method of claim 1 wherein reporting the result of the one or more of the plurality of CO measurements to the network node comprises transmitting the result to the network node.

5. The method of claim 1 wherein obtaining the configuration for the CO measurement and reporting comprises obtaining the configuration via one or more of the group consisting of:
a System Information, SI, broadcast;
dedicated RRC signaling;
Non-Access Stratum, NAS, signaling;
Short Message Service, SMS, signaling; and
communication over a user plane.

6. The method of claim 1 wherein the configuration for the CO measurement and reporting comprises one or more configuration parameters of the group consisting of:
a duration over which the one or more of the plurality of CO measurements should be taken;
one or more time restrictions regarding when the plurality of CO measurements should be taken;
a periodicity of when the one or more of the plurality of CO measurements should be taken;

one or more areas in which the one or more of the plurality of CO measurements should be taken;
one or more networks in which the one or more of the plurality of CO measurements should be taken;
one or more carrier frequencies, bands, and/or bandwidth parts in which the one or more of the plurality of CO measurements should be taken;
a bandwidth of channel monitoring used for the one or more of the plurality of CO measurements;
a duration over which each one of the plurality of CO measurements should be taken;
a period over which the one or more of the plurality of CO measurements should be taken before the report is provided to the network node;
one or more CO measurement types to be used for the one or more of the plurality of CO measurements;
one or more parameters to be included in the report about the one or more of the plurality of CO measurements; and
one or more rules and/or conditions for when the report should be sent to the network node.

7. The method of claim 6 wherein the one or more configuration parameters are different for one or more of the group consisting of:
different bandwidth parts or sub-bands of bandwidth parts;
different carrier frequencies; and
different networks.

8. The method of claim 7 wherein the different networks comprise one or more of the group consisting of: different public land mobile networks; and different neutral host networks.

9. The method of claim 1 wherein the configuration for CO measurement and reporting indicates one or more times at which a nearby base station will not be transmitting, and the wireless device is configured to obtain the plurality of CO measurements when the nearby base station is not transmitting.

10. The method of claim 9 wherein obtaining the plurality of CO measurements comprises obtaining the plurality of CO measurements when the nearby base station is not transmitting.

11. The method of claim 1 wherein the one or more of the plurality of CO measurements are obtained in conjunction with a page monitoring function of the wireless device.

12. The method of claim 1 wherein the one or more of the plurality of CO measurements are obtained in conjunction with a serving cell quality measurement.

13. The method of claim 1 wherein:
the wireless device is configured to communicate with a base station via wireless signals provided at a first frequency; and
the one or more of the plurality of CO measurements occur at a second frequency that is different than the first frequency.

14. The method of claim 13 wherein the wireless device is configured to switch a receiver from the first frequency to the second frequency to perform the one or more of the plurality of CO measurements.

15. The method of claim 1 wherein obtaining the plurality of CO measurements comprises obtaining the plurality of CO measurements only when the wireless device reselects to the second frequency.

16. The method of claim 1 wherein obtaining the plurality of CO measurements comprises one or more of the group consisting of:
measuring the energy within a channel frequency for a channel monitoring period and comparing the measured energy to an energy detection threshold;
measuring a Received Signal Strength Indication, RSSI, within the channel frequency for the channel monitoring period and comparing the measured RSSI to a threshold;
determining if a preamble has been detected during the channel monitoring period; and
determining an interference level within the channel frequency for the channel monitoring period.

17. The method of claim 1 wherein the network operates at least partially in an unlicensed spectrum.

18. The method of claim 1 wherein the network operates at least partially in a Listen Before Talk, LBT, mode of operation.

19. A method performed by a network node for tuning one or more parameters of a network, the method comprising:
transmitting, to a wireless device, a configuration for Channel Occupancy, CO, measurement and reporting;
receiving, from the wireless device, a result of a plurality of CO measurements based on the transmitted configuration for CO measurement and reporting, where:
one or more of the plurality of CO measurements are obtained when a Radio Resource Control, RRC, state of the wireless device is one of the group consisting of: RRC_INACTIVE; and RRC_IDLE; and
the one or more of the plurality of CO measurements are obtained when the RRC state of the wireless device is RRC_CONNECTED, where the result comprises a single report that includes one or more CO measurements obtained from each of:
the group consisting of: RRC_INACTIVE; and RRC_IDLE; and RRC_CONNECTED.

20. The method of claim 19 further comprising:
adjusting one or more operational parameters of the wireless device based on the plurality of CO measurements.

21. The method of claim 20 wherein the one or more operational parameters comprise one or more of the group consisting of:
selection of one or more bandwidth parts or sub-bands of bandwidth parts for subsequent uplink and/or downlink transmissions; and
prioritization of the one or more bandwidth parts or sub-bands of bandwidth parts for subsequent uplink and/or downlink transmissions.

22. The method of claim 19 wherein transmitting the configuration for CO measurement and reporting comprises transmitting the configuration via one or more of the group consisting of:
a System Information, SI, broadcast;
dedicated RRC signaling;
Non-Access Stratum, NAS, signaling;
Short Message Service, SMS, signaling; and
communication over a user plane.

23. The method of claim 19 wherein the configuration for CO measurement and reporting comprises one or more configuration parameters of the group consisting of:
a duration over which the one or more of the plurality of CO measurements should be taken;
one or more time restrictions regarding when the plurality of CO measurements should be taken;
a periodicity of when the one or more of the plurality of CO measurements should be taken;
one or more areas in which the one or more of the plurality of CO measurements should be taken;

one or more networks in which the one or more of the plurality of CO measurements should be taken;

one or more carrier frequencies, bands, and/or bandwidth parts in which one or more of the plurality of CO measurements should be taken;

a bandwidth of channel monitoring used for the one or more of the plurality of CO measurements;

a duration over which each one of the plurality of CO measurements should be taken;

a period over which the one or more of the plurality of CO measurements should be taken before the report is provided to the network node;

one or more CO measurement types to be used for one or more of the plurality of CO measurements;

one or more parameters to be included in the report about one or more of the plurality of CO measurements; and one or more rules and/or conditions for when the report should be sent to the network node.

24. The method of claim 23 wherein the one or more configuration parameters are different for one or more of the group consisting of:
different bandwidth parts or sub-bands of bandwidth parts;
different carrier frequencies; and
different networks.

25. A wireless device for tuning one or more parameters of a network, the wireless device comprising:
one or more processors; and
memory comprising instructions to cause the wireless device to:
obtain a configuration for Channel Occupancy, CO, measurement and reporting;
obtain a plurality of CO measurements based on the obtained configuration for CO measurement and reporting, where:
one or more of the plurality of CO measurements are obtained when a Radio Resource Control, RRC, state of the wireless device is one of the group consisting of: RRC_INACTIVE; and RRC_IDLE; and
the one or more of the plurality of CO measurements are obtained when the RRC state of the wireless device is RRC_CONNECTED; and
report a result of one or more of the plurality of CO measurements to a network node, where the result comprises a single report that includes one or more CO measurements obtained from each of:
the group consisting of: RRC_INACTIVE; and RRC_IDLE; and RRC_CONNECTED.

26. A network node for tuning one or more parameters of a network, the network node comprising:
one or more processors; and
memory comprising instructions to cause the network node to:
transmit, to a wireless device, a configuration for Channel Occupancy, CO, measurement and reporting;
receive, from the wireless device, a result of a plurality of CO measurements based on the transmitted configuration for CO measurement and reporting, where:
one or more of the plurality of CO measurements are obtained when a Radio Resource Control, RRC, state of the wireless device is one of the group consisting of: RRC_INACTIVE; and RRC_IDLE; and
the one or more of the plurality of CO measurements are obtained when the RRC state of the wireless device is RRC_CONNECTED, where the result comprises a single report that includes one or more CO measurements obtained from each of:
the group consisting of: RRC_INACTIVE; and RRC_IDLE; and RRC_CONNECTED.

* * * * *